United States Patent
Ye et al.

(10) Patent No.: US 10,667,025 B2
(45) Date of Patent: May 26, 2020

(54) FRAMING METHOD AND APPARATUS IN PASSIVE OPTICAL NETWORK AND SYSTEM

(71) Applicant: Huawei Technologies Co., Ltd., Shenzhen (CN)

(72) Inventors: Fei Ye, Shenzhen (CN); Dianbo Zhao, Shenzhen (CN); Guikai Peng, Shenzhen (CN); Huafeng Lin, Shenzhen (CN); Ning Cheng, Shenzhen (CN); Xiaofeng Zhang, Shenzhen (CN); Dajiang Tang, Shenzhen (CN); Zhenping Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/818,108

(22) Filed: Nov. 20, 2017

(65) Prior Publication Data
US 2018/0077475 A1    Mar. 15, 2018

Related U.S. Application Data

(63) Continuation of application No. PCT/CN2015/079415, filed on May 20, 2015.

(51) Int. Cl.
*H04Q 11/00* (2006.01)
*H04J 14/00* (2006.01)
*H04B 10/272* (2013.01)

(52) U.S. Cl.
CPC ....... *H04Q 11/0067* (2013.01); *H04B 10/272* (2013.01); *H04J 14/00* (2013.01);
(Continued)

(58) Field of Classification Search
CPC .... H04J 14/00; H04J 14/02; H04J 3/22; H04J 3/167; H04J 3/1611; H04J 3/1652;
(Continued)

(56) References Cited

U.S. PATENT DOCUMENTS 7,653,312 B2 *  1/2010  Mori .................... H04J 3/1617
                                                      398/100
7,818,389 B1 * 10/2010  Chiang ................... H01M 4/92
                                                      709/212
(Continued)

FOREIGN PATENT DOCUMENTS

CN      101569122 A     10/2009
CN      101577600 A     11/2009
(Continued)

OTHER PUBLICATIONS

Khotimsky, D., "Draft revised Recommendation ITU-TG.984.3 (for Consent, Dec. 6, 2013)," XP044073073, TD162 Rev.1 (PLEN/15), vol. 2115, Dec. 5, 2013, 186 pages.
(Continued)

*Primary Examiner* — Tri H Phan
(74) *Attorney, Agent, or Firm* — Conley Rose, P.C.

(57) ABSTRACT

A framing method and apparatus in a passive optical network (PON) and a system, where the method includes generating a first transmission convergence (TC) frame and a second TC frame separately, wherein a sum of frame lengths of the first and the second TC frame is 125 microseconds (μs), performing bit mapping on the second TC frame to generate a third TC frame, where the bit mapping refers to identifying each bit of the second TC frame using N bits, and sending the first and the second TC frame to an optical network unit (ONU). A line rate corresponding to the second TC frame is lower than 2.488 giga bits per second (Gbps) such that a rate of a receiver on a receiving side is decreased and a bandwidth of the receiver is narrowed,
(Continued)

thereby decreasing an optical link loss and increasing an optical power budget.

26 Claims, 12 Drawing Sheets

(52) U.S. Cl.
CPC ..... *H04Q 11/0003* (2013.01); *H04Q 11/0005* (2013.01); *H04Q 2011/0049* (2013.01); *H04Q 2011/0088* (2013.01); *H04Q 2213/13168* (2013.01)

(58) Field of Classification Search
CPC .... H04J 3/1658; H04J 3/1664; H04J 14/0245; H04J 14/026; H04J 14/0254; H04J 14/0256; H04J 14/0273; H04J 14/0275; H04Q 11/00; H04Q 11/0003; H04Q 11/0005; H04Q 11/0067; H04Q 2011/0049; H04Q 2011/0088; H04Q 2213/13168; H04Q 11/0001; H04Q 2011/0069; H04Q 2213/13297; H04B 10/272
See application file for complete search history.

(56) References Cited

U.S. PATENT DOCUMENTS

| | | | | |
|---|---|---|---|---|
| 7,894,485 | B2 * | 2/2011 | Frank | H04J 3/1611 370/395.51 |
| 7,899,328 | B2 * | 3/2011 | Krimmel | H04J 3/1694 398/63 |
| 7,949,255 | B2 * | 5/2011 | Zou | H04Q 11/0067 398/168 |
| 8,126,335 | B2 * | 2/2012 | Khermosh | H04J 14/0282 398/140 |
| 8,139,950 | B2 * | 3/2012 | Niibe | H04Q 11/0067 398/100 |
| 8,190,026 | B2 * | 5/2012 | Luo | H04Q 11/0067 370/392 |
| 8,199,775 | B2 * | 6/2012 | Mori | H04Q 11/0067 370/230.1 |
| 8,315,520 | B2 * | 11/2012 | Zou | H04J 3/1694 398/58 |
| 8,351,785 | B2 * | 1/2013 | Luo | H04Q 11/0067 398/58 |
| 8,369,705 | B2 * | 2/2013 | de Lind van Wijngaarden | H04Q 11/0066 398/70 |
| 8,422,612 | B2 | 4/2013 | Ide et al. | |
| 8,451,836 | B2 * | 5/2013 | Li | H04L 47/22 370/389 |
| 8,477,800 | B2 * | 7/2013 | Kazawa | H04Q 11/0067 370/441 |
| 8,718,087 | B1 * | 5/2014 | Johnston | H04L 12/12 370/463 |
| 8,781,321 | B2 * | 7/2014 | Luo | H04Q 11/0067 370/412 |
| 8,811,819 | B2 * | 8/2014 | Kazawa | H04B 10/272 398/43 |
| 8,824,504 | B2 * | 9/2014 | Zou | H04Q 11/0067 370/395.51 |
| 8,903,250 | B2 * | 12/2014 | Boyd | H04B 10/524 398/153 |
| 9,577,758 | B2 * | 2/2017 | Boyd | H04B 10/40 |
| 9,749,078 | B2 * | 8/2017 | Khotimsky | H04Q 11/0067 |
| 10,177,871 | B2 * | 1/2019 | Luo | H04J 3/1694 |
| 2003/0137975 | A1 * | 7/2003 | Song | H04J 3/0652 370/353 |
| 2008/0056721 | A1 | 3/2008 | Mori | |
| 2008/0298806 | A1 | 12/2008 | Effenberger | |
| 2009/0263130 | A1 | 10/2009 | Luo et al. | |
| 2010/0070822 | A1 | 3/2010 | Leung et al. | |
| 2011/0320905 | A1 | 12/2011 | Lin et al. | |
| 2012/0008940 | A1 | 1/2012 | de Lind van Wijngaarden | |
| 2012/0093500 | A1 | 4/2012 | Shiba et al. | |
| 2013/0077961 | A1 * | 3/2013 | Dvir | H04B 10/071 398/16 |
| 2014/0023369 | A1 | 1/2014 | Zheng | |
| 2019/0007133 | A1 * | 1/2019 | Soto | H04B 10/0775 |

FOREIGN PATENT DOCUMENTS

| | | |
|---|---|---|
| CN | 101668003 A | 3/2010 |
| CN | 102396189 A | 3/2012 |
| CN | 102461041 A | 5/2012 |
| KR | 20080050196 A | 6/2008 |
| KR | 20100134645 A | 12/2010 |
| KR | 101363541 B1 | 2/2014 |
| WO | 2014063656 A1 | 5/2014 |

OTHER PUBLICATIONS

Machine Translation and Abstract of Chinese Publication No. CN101668003, Mar. 10, 2010, 17 pages.
Foreign Communication From a Counterpart Application, European Application No. 15892209.6, Extended European Search Report dated Apr. 4, 2018, 11 pages.
Foreign Communication From a Counterpart Application, Chinese Application No. 201580014392.X, Chinese Search Report dated Mar. 22, 2018, 2 pages.
Foreign Communication From a Counterpart Application, Chinese Application No. 201580014392.X, Chinese Office Action dated Apr. 3, 2018, 3 pages.
"Series G: Transmission Systems and Media, Digital Systems and Networks, Digital sections and digital line systems—Optical line systems for local and access networks, Gigabit-capable passive optical networks (G-PON): Transmission convergence layer specification" ITU-T, G.984.3, Jan. 2014, 170 pages.
Foreign Communication From a Counterpart Application, PCT Application No. PCT/CN2015/079415, English Translation of International Search Report dated Feb. 19, 2016, 2 pages.
Foreign Communication From a Counterpart Application, PCT Application No. PCT/CN2015/079415, English Translation of Written Opinion dated Feb. 19, 2016, 5 pages.
Machine Translation and Abstract of Korean Publication No. KR20080050196, Jun. 5, 2008, 20 pages.
Foreign Communication From a Counterpart Application, Korean Application No. 10-2017-7036224, Korean Office Action dated Jul. 31, 2019, 7 pages.
Foreign Communication From a Counterpart Application, Korean Application No. 10-2017-7036224, English Translation of Korean Office Action dated Jul. 31, 2019, 5 pages.

* cited by examiner

FRAMING METHOD AND APPARATUS IN PASSIVE OPTICAL NETWORK AND SYSTEM

CROSS-REFERENCE TO RELATED APPLICATIONS

This application is a continuation of International Patent Application No. PCT/CN2015/079415 filed on May 20, 2015, which is hereby incorporated by reference in its entirety.

TECHNICAL FIELD

The present disclosure relates to the communications field, and in particular, to a framing method and apparatus in a passive optical network (PON), a deframing method and apparatus in a PON, and a system.

BACKGROUND

With the rapid development of optical communications technologies, a PON system is increasingly widely applied in optical communications technologies. A PON architecture is shown in FIG. 1, and the architecture is used as an example for description below. A PON consists of an optical line terminal (OLT) 110 on an office side, an optical network unit (ONU) 120 (or an optical network terminal (ONT)) on a user side, and an optical distribution network (ODN) 130. A tree topology structure is generally used in the PON.

The OLT 110 provides a network side interface to the PON system to connect one or more ODNs 130. The ONU 120 provides a user side interface to the PON system to connect the ODN 130. If the ONU 120 directly provides a function of a user port, for example, an Ethernet user port used by a personal computer (PC) to access the Internet, the ONU 120 is referred to as the ONT 120. Unless otherwise indicated, the ONU 120 mentioned below generally refers to the ONU and the ONT. The ODN 130 is a network consisting of an optical fiber and a passive optical splitter configured to connect the OLT 110 and the ONU 120 and further configured to perform distribution or multiplexing on a data signal between the OLT 110 and the ONU 120.

In the PON system, a direction from the OLT 110 to the ONU 120 is referred to as a downstream direction. In contrast, a direction from the ONU 120 to the OLT 110 is referred to as an upstream direction. In a gigabit-capable PON (GPON), based on a specification in the current International telecommunication Union (ITU) G.984 series standards, a downstream transmission rate is generally 2.488 gigabits per second (Gbps) (i.e. 2488 megabits per second (Mbps)), and only one downstream transmission rate exists during running of the entire system.

Generally, in design of an optical network, to ensure that required performance levels are reached in various optical transmission sections, a budget of a total optical power loss needs to be planned, where the budget is referred to as an optical power budget. Losses allowable in the optical power budget are defined as optical losses S/R and R/S (S denotes a reference point of optical signal sending, and R denotes a reference point of optical signal receiving) between reference points, which are expressed in decibels (dB). The loss includes a loss caused by an optical fiber and a loss caused by a passive optical element. In an existing ODN network, an optical power budget may become insufficient because an optical link loss increases. Therefore, how to increase an optical power budget of a PON system is a problem that urgently needs to be resolved.

SUMMARY

In view of this, embodiments of the present disclosure provide a framing method and apparatus in a PON system and a deframing method and apparatus in a PON system, which can increase an optical power budget of the PON system.

According to a first aspect, a framing method in a PON is provided, including generating a first transmission convergence (TC) frame and a second TC frame separately, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 microseconds (µs), where N is an integer greater than 1, performing bit mapping on the second TC frame to generate a third TC frame, where the bit mapping refers to identifying each bit of the second TC frame using N bits, and sending the first TC frame and the third TC frame to an ONU.

With reference to the first aspect, in a first possible implementation manner of the first aspect, the method further includes performing first coding on the second TC frame, where the first coding is one of Reed-Solomon code RS (255,239) coding or RS (248,216) coding, low-density parity-check code LDPC coding, or cascade forward error correction (FEC) coding.

With reference to the first aspect or the first possible implementation manner of the first aspect, in a second possible implementation manner of the first aspect, the method further includes performing scrambling on the second TC frame.

With reference to the first aspect or the first possible implementation manner of the first aspect, in a third possible implementation manner of the first aspect, the method further includes inserting a pseudo GPON encapsulation method (GEM) frame header into the third TC frame. By means of this implementation manner, an original ONU (the original ONU refers to an ONU whose receive rate is 2.488 Gbps in a GPON system, or an ONU whose receive rate is 10 Gbps in a 10-GPON (XG-PON)) may not generate a GEM frame loss alarm when receiving the third TC frame.

With reference to the third possible implementation manner of the first aspect, in a fourth possible implementation manner of the first aspect, inserting a pseudo GEM frame header into the third TC frame further includes inserting a placeholder into the third TC frame, performing scrambling on the third TC frame into which the placeholder is inserted, and filling the placeholder using the pseudo GEM frame header.

With reference to the fourth possible implementation manner of the first aspect, in a fifth possible implementation manner of the first aspect, the method further includes performing second coding on the first TC frame and the third TC frame into which the pseudo GEM frame header is inserted, where the second coding is one of RS (255,239) coding or RS (248,216) coding, LDPC coding, or cascade FEC coding. By means of this implementation manner, the original ONU may not generate an FEC alarm when receiving the third TC frame.

With reference to the fifth possible implementation manner of the first aspect, in a sixth possible implementation manner of the first aspect, third scrambling is performed on the first TC frame and the third TC frame that have undergone the second coding.

With reference to the first aspect or any possible implementation manner of the first aspect, in a seventh possible implementation manner of the first aspect, a physical control block downstream (PCBd) field of the second TC frame includes a field used to indicate the frame length of the second TC frame.

With reference to the first aspect or any possible implementation manner of the first aspect, in an eighth possible implementation manner of the first aspect, the frame length of the first TC frame is an integer multiple of 239 bytes. By means of this implementation manner, in the GPON system, if the frame length of the first TC frame is an integer multiple of 239 bytes, an FEC coding procedure of the first TC frame may be simplified such that a solution for processing FEC decoding by the ONU whose receive rate is 2.488 Gbps is the same as a solution in other approaches.

With reference to the first aspect or any of the first to seventh possible implementation manners of the first aspect, in a ninth possible implementation manner of the first aspect, the frame length of the first TC frame is an integer multiple of 248 bytes. By means of this implementation manner, in the XG-PON system, if the frame length of the first TC frame is an integer multiple of 248 bytes, an FEC coding procedure of the first TC frame may be simplified such that a solution for processing FEC decoding by the ONU whose receive rate is 10 Gbps is the same as a solution in the other approaches.

According to a second aspect, a deframing method in a PON is provided, where the method includes receiving a downstream data stream, where the downstream data stream includes a first TC frame and a second TC frame, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 µs, where N is an integer greater than 1, performing synchronization with the first TC frame, and parsing the first TC frame.

With reference to the second aspect, in a first possible implementation manner of the second aspect, the method further includes performing descrambling on the first TC frame.

With reference to the second aspect or the first possible implementation manner of the second aspect, in a second possible implementation manner of the second aspect, the method further includes discarding the second TC frame.

With reference to the second aspect or any possible implementation manner of the second aspect, in a third possible implementation manner of the second aspect, the method further includes decoding the first TC frame.

With reference to the second aspect or any possible implementation manner of the second aspect, in a fourth possible implementation manner of the second aspect, discarding the second TC frame includes discarding the second TC frame according to a port identifier (Port-ID) field of a pseudo GEM frame.

With reference to the fourth possible implementation manner of the second aspect, in a fifth possible implementation manner of the second aspect, discarding the second TC frame according to a Port-ID field of a pseudo GEM frame further includes discarding the pseudo GEM frame carrying the Port-ID and the second TC frame that is after the pseudo GEM frame when the Port-ID is different from a Port-ID recorded by an ONU.

According to a third aspect, a deframing method in a PON is provided, where the method includes receiving a downstream data stream, where the downstream data stream includes a first TC frame and a second TC frame, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 µs, where N is an integer greater than 1, obtaining the second TC frame, performing bit mapping restoration on the second TC frame to generate a third TC frame, where the bit mapping restoration refers to restoration of every N bits in the second TC frame to one bit, and parsing the third TC frame.

With reference to the third aspect, in a first possible implementation manner of the third aspect, the method further includes performing descrambling on the second TC frame.

With reference to the third aspect or the first possible implementation manner of the third aspect, in a second possible implementation manner, the method further includes decoding the second TC frame.

With reference to the third aspect or any possible implementation manner of the third aspect, in a third possible implementation manner, obtaining the second TC frame includes removing, according to frame length information of the second TC frame that is indicated by a length of an asynchronous transfer mode (ATM) block (Alen) field in a PCBd field of the second TC frame, a pseudo GEM frame from the received second TC frame, to obtain the second TC frame.

According to a fourth aspect, a framing apparatus is provided, including a generation module configured to generate a first gigabit-capable PON TC frame and a second TC frame separately, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 µs, where N is an integer greater than 1, a mapping module configured to perform bit mapping on the second TC frame to generate a third TC frame, where the bit mapping refers to identifying each bit of the second TC frame using N bits, and a transmission module configured to send the first TC frame and the third TC frame to an ONU.

With reference to the fourth aspect, in a first possible implementation manner of the fourth aspect, the apparatus further includes a coding module configured to perform coding on the second TC frame, where the first coding is one of RS (255,239) coding or RS (248,216) coding, or LDPC coding, or cascade FEC coding.

With reference to the fourth aspect or the first possible implementation manner of the fourth aspect, in a second possible implementation manner of the fourth aspect, the apparatus further includes a scrambling module, where the scrambling module is configured to perform scrambling on the second TC frame.

With reference to the fourth aspect or any possible implementation manner of the fourth aspect, in a third possible implementation manner of the fourth aspect, the apparatus further includes a processing module configured to insert a pseudo GEM frame header into the third TC frame.

With reference to the fourth possible implementation manner of the fourth aspect, in a fifth possible implementation manner of the fourth aspect, the processing module is further configured to insert a placeholder into the third TC frame, perform scrambling on the third TC frame into which the placeholder is inserted, and fill the placeholder using the pseudo GEM frame header.

With reference to the fifth possible implementation manner of the fourth aspect, in a sixth possible implementation manner of the fourth aspect, the coding module is further configured to perform second coding on the first TC frame and the third TC frame into which the pseudo GEM frame header is inserted, where the second coding is one of RS (255,239) coding or RS (248,216) coding, LDPC coding, or cascade FEC coding.

With reference to the sixth possible implementation manner of the fourth aspect, in a seventh possible implementation manner of the fourth aspect, the scrambling module is further configured to perform scrambling on the first TC frame and the third TC frame that have undergone the second coding.

With reference to the fourth aspect or any possible implementation manner of the fourth aspect, in an eighth possible implementation manner of the fourth aspect, a physical control block (PCB) field of the second TC frame includes a field used to indicate the frame length of the second TC frame.

With reference to the fourth aspect or any possible implementation manner of the fourth aspect, in a ninth possible implementation manner of the fourth aspect, the frame length of the first TC frame is an integer multiple of 239 bytes.

With reference to the fourth aspect or any one of the first to eighth possible implementation manners of the fourth aspect, in a tenth possible implementation manner of the fourth aspect, the frame length of the first TC frame is an integer multiple of 248 bytes.

According to a fifth aspect, a deframing apparatus is provided, where the apparatus includes a receiving module configured to receive a downstream data stream, where the downstream data stream includes a first TC frame and a second TC frame, a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1, a synchronization module configured to perform synchronization with the first TC frame, and a parsing module configured to parse the first TC frame.

With reference to the fifth aspect, in a first possible implementation manner of the fifth aspect, the apparatus further includes a descrambling module configured to perform descrambling on the first TC frame.

With reference to the fifth aspect or the first possible implementation manner of the fifth aspect, in a second possible implementation manner of the fifth aspect, the apparatus further includes a decoding module configured to decode the first TC frame.

With reference to the fifth aspect or any possible implementation manner of the fifth aspect, in a third possible implementation manner of the fifth aspect, the apparatus further includes a discarding module configured to discard the second TC frame.

With reference to the third possible implementation manner of the fifth aspect, in a fourth possible implementation manner, the discarding module is further configured to discard the second TC according to a Port-ID field of a pseudo GEM frame.

With reference to the fourth possible implementation manner of the fifth aspect, in a fifth possible implementation manner, the discarding module is further configured to discard the second TC according to the Port-ID field of the pseudo GEM frame, where the discarding the second TC further includes discarding the pseudo GEM frame carrying the Port-ID and the second TC frame that is after the pseudo GEM frame when that the Port-ID is different from a Port-ID locally recorded by an ONU.

According to a sixth aspect, a deframing apparatus is provided, including a receiving module configured to receive a downstream data stream, where the downstream data stream includes a first TC frame and a second TC frame, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1, an obtaining module configured to obtain the second TC frame, a restoration module configured to perform bit mapping restoration on the second TC frame to generate a third TC frame, where the bit mapping restoration refers to restoration of every N bits in the second TC frame to one bit, and a parsing module configured to perform parsing processing on the third TC frame.

With reference to the sixth aspect, in a first possible implementation manner of the sixth aspect, the apparatus further includes a descrambling module configured to perform descrambling on the second TC frame.

With reference to the sixth aspect or the first possible implementation manner of the sixth aspect, in a second possible implementation manner of the sixth aspect, the apparatus further includes a decoding module configured to decode the second TC frame.

With reference to the sixth aspect or any possible implementation manner of the sixth aspect, in a third possible implementation manner of the sixth aspect, the obtaining module is further configured to discard, according to frame length information of the second TC frame that is identified by an Alen field in PCBd of the second TC frame, a pseudo GEM frame, to obtain the second TC frame.

With reference to the sixth aspect or any possible implementation manner of the sixth aspect, in a fourth possible implementation manner of the sixth aspect, the parsing module is further configured to perform bit mapping restoration on the second TC frame, where the bit mapping restoration refers to restoration of every N bits to one bit, and parse the restored second TC frame.

According to a seventh aspect, a PON system is provided, including an OLT and an ONU, where the OLT is connected to the ONU using an ODN, where the OLT is the framing apparatus according to the fourth aspect or any possible implementation manner of the fourth aspect, and the ONU is the deframing apparatus according to the sixth aspect or any possible implementation manner of the sixth aspect.

According to an eighth aspect, a framing apparatus is provided, where the framing apparatus includes a processor and a memory, where the processor is connected to the memory using a bus, an executable instruction is stored in the memory, and when the processor executes the executable instruction, the processor performs the following steps of generating a first TC frame and a second TC frame separately, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1, performing bit mapping on the second TC frame to generate a third TC frame, where the bit mapping refers to identifying each bit of the second TC frame using N bits, and sending the first TC frame and the third TC frame to an ONU.

With reference to the eighth aspect, in a first possible implementation manner of the eighth aspect, the processor further performs a step of performing first coding on the second TC frame, where the first coding is one of RS (255,239) coding or RS (248,216) coding, LDPC coding, or cascade FEC coding.

With reference to the eighth aspect or the first possible implementation manner of the eighth aspect, in a second possible implementation manner of the eighth aspect, the processor further performs a step of inserting a pseudo GEM frame header into the third TC frame.

With reference to the second possible implementation manner of the eighth aspect, in a third possible implementation manner of the eighth aspect, inserting a pseudo GEM frame header into the third TC frame includes inserting a placeholder into the third TC frame, performing scrambling on the third TC frame into which the placeholder is inserted, and filling the placeholder using the pseudo GEM frame header.

With reference to the third possible implementation manner of the eighth aspect, in a fourth possible implementation manner of the eighth aspect, the processor further performs a step of performing second coding on the first TC frame and the third TC frame into which the pseudo GEM frame is inserted, where the second coding is one of RS (255,239) coding or RS (248,216) coding, LDPC coding, or cascade FEC coding.

With reference to the fourth possible implementation manner of the eighth aspect, in a fifth possible implementation manner of the eighth aspect, the processor further performs a step of performing scrambling on the first TC frame and the third TC frame that have undergone the second coding.

With reference to the eighth aspect or any possible implementation manner of the eighth aspect, in a sixth possible implementation manner of the eighth aspect, a PCBd field of the second TC frame includes a field used to indicate the frame length of the second TC frame.

With reference to the eighth aspect or any possible implementation manner of the eighth aspect, in a seventh possible implementation manner of the eighth aspect, the frame length of the first TC frame is an integer multiple of 239 bytes.

With reference to the eighth aspect or any one of the first to sixth possible implementation manners of the eighth aspect, in an eighth possible implementation manner of the eighth aspect, the frame length of the first TC frame is an integer multiple of 248 bytes.

According to a ninth aspect, a deframing apparatus is provided, where the deframing apparatus includes a processor and a memory, where the processor is connected to the memory using a bus, an executable instruction is stored in the memory, and when the processor executes the executable instruction, the processor performs the following steps of receiving a downstream data stream, and performing synchronization with a first TC frame in the downstream data stream, where the downstream data stream includes the first TC frame and a second TC frame, a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 µs, where N is an integer greater than 1, and obtaining the first TC frame, and parsing the first TC frame.

With reference to the ninth aspect, in a first possible implementation manner of the ninth aspect, the processor further performs a step of descrambling the first TC frame.

With reference to the ninth aspect or the first possible implementation manner of the ninth aspect, in a second possible implementation manner of the ninth aspect, the processor further performs a step of discarding the second TC frame.

With reference to the ninth aspect or any possible implementation manner of the ninth aspect, in a third possible implementation manner of the ninth aspect, the processor further performs a step of decoding the first TC frame.

With reference to the second possible implementation manner of the ninth aspect, in a fourth possible implementation manner of the ninth aspect, the processor further performs a step of discarding the second TC frame, and discarding the second TC frame includes discarding the second TC frame according to a Port-ID field of a pseudo GEM frame.

With reference to the fourth possible implementation manner of the ninth aspect, in a fifth possible implementation manner of the ninth aspect, when the Port-ID is different from a Port-ID locally recorded by an ONU, discarding the pseudo GEM frame that carries the Port-ID and bytes that are after the pseudo GEM frame.

According to a tenth aspect, a deframing apparatus is provided, where the deframing apparatus includes a processor and a memory, where the processor is connected to the memory using a bus, an executable instruction is stored in the memory, and when the processor executes the executable instruction, the processor performs the following steps of receiving a downstream data stream, where the downstream data stream includes a first TC frame and a second TC frame, where a downstream rate of the first TC frame complies with a standard, a downstream rate of the second TC frame is 1/N of the downstream rate of the first TC frame, a sum of frame lengths of the first TC frame and the second TC frame is 125 µs, and an interval between frame headers of second TC frames is 125 µs, where N is an integer greater than 1, obtaining the second TC frame, performing bit mapping restoration on the second TC frame to generate a third TC frame, where the bit mapping restoration refers to restoration of every N bits in the second TC frame to one bit, and parsing the third TC frame.

With reference to the tenth aspect, in a first possible implementation manner of the tenth aspect, the processor further performs a step of descrambling the second TC frame.

With reference to the tenth aspect or the first possible implementation manner of the tenth aspect, in a second possible implementation manner of the tenth aspect, the processor further performs a step of decoding the second TC frame.

With reference to the tenth aspect or any possible implementation manner of the tenth aspect, in a third possible implementation manner of the tenth aspect, the processor is configured to perform the obtaining the second TC frame, where obtaining the second TC frame includes removing, according to frame length information of the second TC frame that is indicated by an Alen field in a PCBd field of the second TC frame, a pseudo GEM frame field from the received second TC frame to obtain the second TC frame.

In the embodiments of the present disclosure, the framing method is provided on a sending side, and in the framing method, a line rate corresponding to a second TC frame is lower than a line rate of a first TC frame such that a rate of a receiver on a receiving side is decreased and a bandwidth of the receiver is narrowed, thereby decreasing an optical link loss and increasing an optical power budget.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
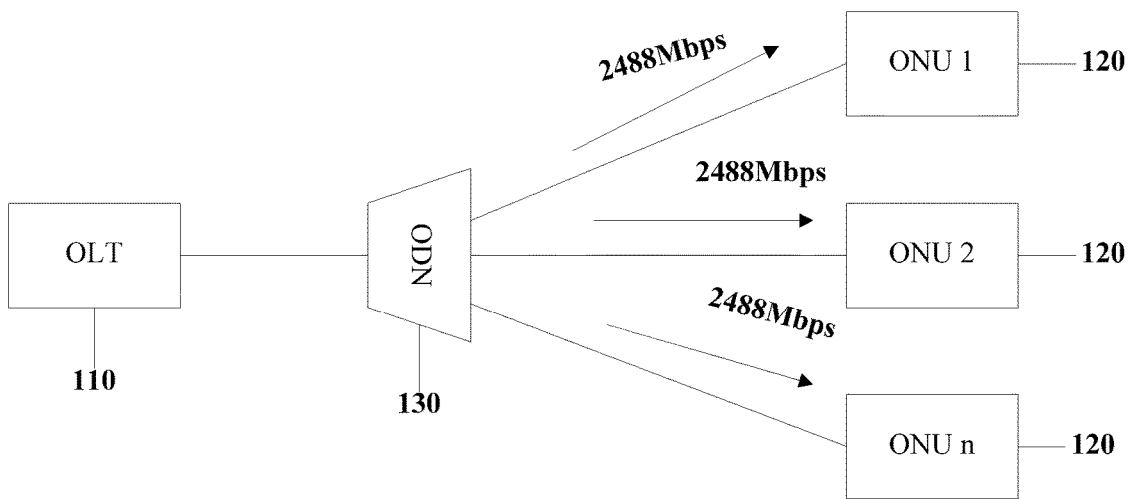
FIG. 1 is a schematic structural diagram of a GPON network.

The following clearly and describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A GPON technology complies with an integrated passive optical access standard-G.984.3 series made by the ITU-Telecommunication Standardization Sector (ITU-T), and is characterized by high bandwidth, high efficiency, large coverage, abundant user interfaces, and the like. Currently, there are multiple transmission rates in the GPON technology. 1.24416 Gbps in an upstream direction and 2.48832 Gbps in a downstream direction are currently most common GPON transmission rates, and are referred to as upstream 1.244 Gbps and downstream 2.488 Gbps for short in the following. It is specified in the existing G.984.3 standard that a length of a downstream GTC frame is 125 μs, that is, the downstream GTC frame includes 38,880 bytes in total, and a length of an upstream frame is 125 μs, that is, 19,440 bytes.

A GTC layer is defined in the standard G.984.3. The GTC layer may be used as a common transmission platform to bear various customer signals such as an ATM signal and a GEM signal. The GTC layer further includes a framing sub-layer and an adaptation sub-layer. The framing sub-layer is used to implement encapsulation of a GTC frame and terminate a required ODN transmission function and a required particular PON function (such as ranging and bandwidth allocation). The adaptation sub-layer mainly provides an interface between a protocol data unit (PDU) and a high-layer entity. Conversion of ATM information and GEM information between a service data unit (SDU) and a PDU is completed at respective adaptation sub-layers.

An XG-PON (may also be referred to as 10 G-GPON) indicates a next generation GPON, which is a PON system whose downstream rate reaches 10 Gbps. Generally, the 10 G-GPON belongs to a first phase of the next generation PON (NG-PON1) and corresponds to the G.987 series standards, where an asymmetric system (the asymmetric system refers to a system whose upstream rate is 2.5 Gbps and downstream rate is 10 Gbps) is referred to as XG-PON1, and a symmetrical system (the symmetrical system refers to a system whose upstream rate is 10 Gbps and downstream rate is 10 Gbps) is referred to as XG-PON2. It is specified in the existing standard G.987 that a downstream XG-PON frame transmitted at a TC layer is referred to as a PHY frame, and a frame length of the PHY frame is 125 μs, that is, a downstream PHY frame includes 155,520 bytes in total, of which a quantity is four times as large as a quantity of bytes included in the GTC frame in the GPON.

Currently, for the XG-PON1, the ITU-T has made substantive progress, and standardization of the XG-PON2 is in process. Similarly, the XG-PON1 also has a TC layer, which is referred to as an XGTC layer. The TC layer of the XG-PON1 is divided into a service adaptation sub-layer, a framing sub-layer, and a physical adaptation sub-layer. The service adaptation sub-layer mainly covers functions such as encapsulation of an XGEM frame and allocation and filtering of an XGEM-ID, and supports segmentation and recombination of data units and a delineation function of an XGEM frame. The framing sub-layer includes a function such as encapsulation and parsing of an XGTC frame or a burst data frame, an embedded operation and administration message (OAM) function, a physical layer operations, administration and maintenance (PLOAM) function, and filtering of an allocation identifier (Alloc-ID). The physical adaptation sub-layer is configured to implement a FEC code function, a line coding function, and a burst data overhead function.

Figure 2A:
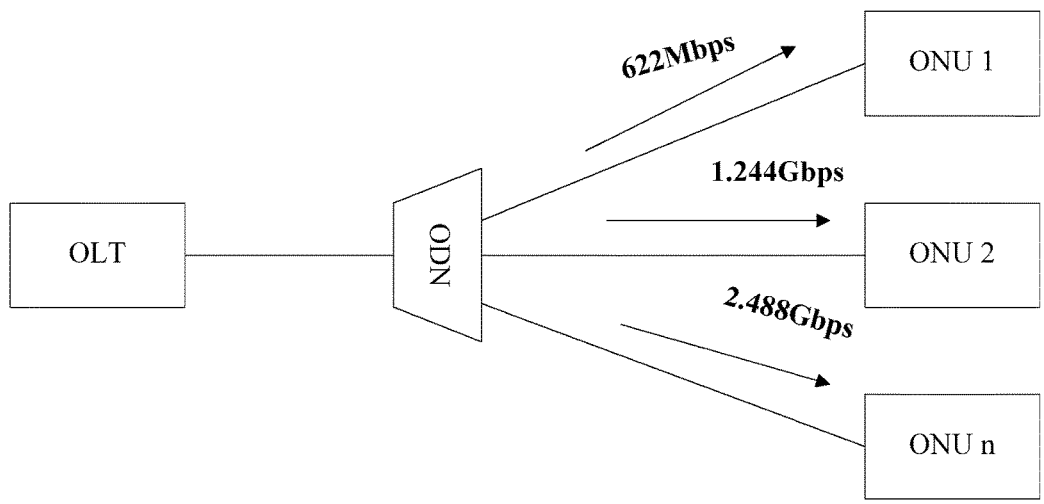
FIG. 2A is a schematic structural diagram of a PON network in which multiple rates coexist according to an embodiment of the present disclosure.

FIG. 2A is a schematic structural diagram of a PON network in which multiple rates coexist according to an embodiment of the present disclosure. As shown in FIG. 2A, the PON system is a GPON system, and includes an OLT, an ODN, and at least two ONUs (designated as ONU 1, ONU 2, and ONU n). A downstream receive rate of one ONU is 2.488 Gbps, which is based on a specification of the standard G.984.3, and a downstream receive rate of another ONU is 1/N of 2.488 Gbps, where N is an integer greater than 1. For example, in a specific implementation manner, the downstream receive rate of the ONU may be 1244 Mbps (i.e., 1.244 Gbps) or 622 Mbps. A person of ordinary skill in the art should understand that in the GPON system, different transmission rates coexist in a downstream direction in a time division manner, and an upstream bandwidth is shared in an upstream direction by means of time division multiplexing (TDM). A benefit of the network structure is that, when an operator increases an optical power budget of the system, the network structure can be compatible with an existing GPON network, that is, reconstruction is performed based on the existing GPON network such that a reconstruction cost is reduced.

Figure 2B:
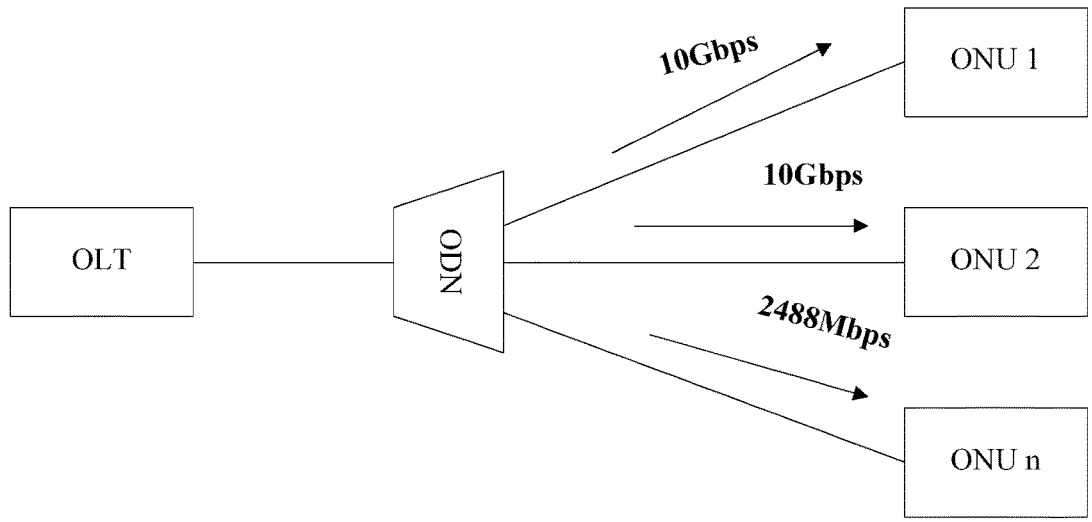
FIG. 2B is a schematic structural diagram of another PON network in which multiple rates coexist according to an embodiment of the present disclosure.

FIG. 2B is a schematic structural diagram of another PON network in which multiple rates coexist according to an embodiment of the present disclosure. As shown in FIG. 2B, the PON system is an XG-PON system, and includes an OLT, an ODN, and at least two ONUs (designated as ONU 1, ONU 2, and ONU n). A downstream receive rate of one ONU is 10 Gbps, which is based on a specification of the standard G.987.3 (in a strict sense, the downstream receive rate is four times of 2.488 Gbps, that is, 9.95328 Gbps. However, for a person skilled in the art, 9.95328 Gbps is often referred to as 10 Gbps), and a downstream receive rate of another ONU is 1/M of 10 Gbps, where M is an integer greater than 1. For example, the downstream receive rate may be 2.488 Gbps (i.e., 2488 Mbps), or may be 4.97664 Gbps. A person of ordinary skill in the art should understand that in the XG-PON system, different transmission rates coexist in a downstream direction in a time division manner, and an upstream bandwidth is shared in an upstream direction by means of TDM. A benefit of the network structure is that, when an operator increases an optical power budget using the method provided in this embodiment of the present disclosure, the network structure can be compatible with the deployed XG-PON network, that is, reconstruction is performed based on the existing XG-PON network such that a reconstruction cost is reduced.

This embodiment of the present disclosure is based on the network structures in FIG. 2A and FIG. 2B. For ease of understanding, a general idea of this embodiment of the present disclosure is to provide a network structure in which multiple rates coexist, where the network structure in which multiple rates coexist may be implemented by reconstructing a present network. For example, a downstream receive rate of an ONU of a GPON of the present network is 2.488 Gbps, and by deploying some ONUs whose receive rate is 1/N of 2.488 Gbps in the OLT, the network has ONUs of at least two rates. A particular frame is generated on an OLT side, and the particular frame is logically divided into two parts, where the two parts are referred to as a first frame and a second frame. A structure of the first frame corresponds to a specification of an existing standard, and a particular structure is used for a structure of the second frame such that when the particular frame is received on an ONU side, an existing ONU (that is, an ONU whose downstream receive rate is 2.488 Gbps) of the GPON identifies the first frame and parses the first frame using the method provided in this embodiment of the present disclosure. An ONU (that is, an ONU whose downstream receive rate is 1/N of 2.488 Gbps) that newly joins the network identifies the second frame and parses the second frame using the method provided in this embodiment of the present disclosure. Therefore, by means of this method, an optical power budget of an entire system is increased without affecting an existing network system. For specific content of the present disclosure, refer to specific embodiments.

Embodiment 1

Figure 3:
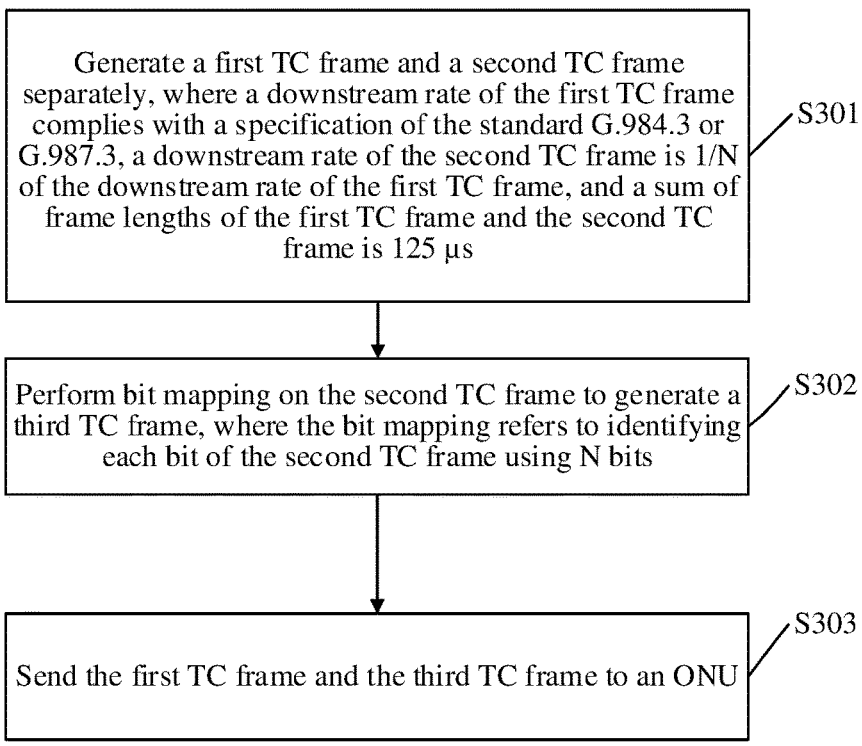
FIG. 3 is a schematic flowchart of a framing method in a PON according to an embodiment of the present disclosure.

FIG. 3 is a schematic flowchart of a framing method according to an embodiment of the present disclosure. The method is applied in the network structure shown in FIG. 2A or FIG. 2B. As shown in FIG. 3, the method includes the following steps.

Step S301: Generate a first TC frame and a second TC frame separately, where a downstream rate of the first TC frame complies with a specification of the standard G.984.3 or G.987.3, a downstream rate of the second TC frame is 1/N of the downstream rate of the first TC frame, and a sum of frame lengths of the first TC frame and the second TC frame is 125 μs, where N is an integer greater than 1 and the downstream rate of the first TC frame is 2.488 Gbps or 10 Gbps.

Step S302: Perform bit mapping on the second TC frame to generate a third TC frame, where the bit mapping refers to identifying each bit of the second TC frame using N bits.

Step S303: Send the first TC frame and the third TC frame to an ONU.

A value of N is one of 2, 4, or 8.

An interval between frame headers of second TC frames is also 125 μs.

In this embodiment of the present disclosure, further, if the first TC frame and the second TC frame are applied in a GPON system, a structure of the first TC frame is similar to a structure of a GTC frame defined in the existing standard G.984.3, where both the structures include a PCBd field and a payload field, but have different total quantities of bytes. For details, refer to the following description. If the first TC frame and the second TC frame are applied in an XG-PON system, a structure of the first TC frame is similar to a structure of a PHY frame defined in the existing standard G.987.3, where both the structures include a PCBd field and a payload field, but have different total quantities of bytes. For details, refer to the following description. This embodiment of the present disclosure is further described below in detail by separately using the GPON system and the XG-PON system.

The structure of the GTC frame is shown in FIG. 4A to FIG. 4E, and consists of a PCBd part and a GTC payload (designated as GTC Payload) part. The PCBd consists of the following fields.

Figure 4A:
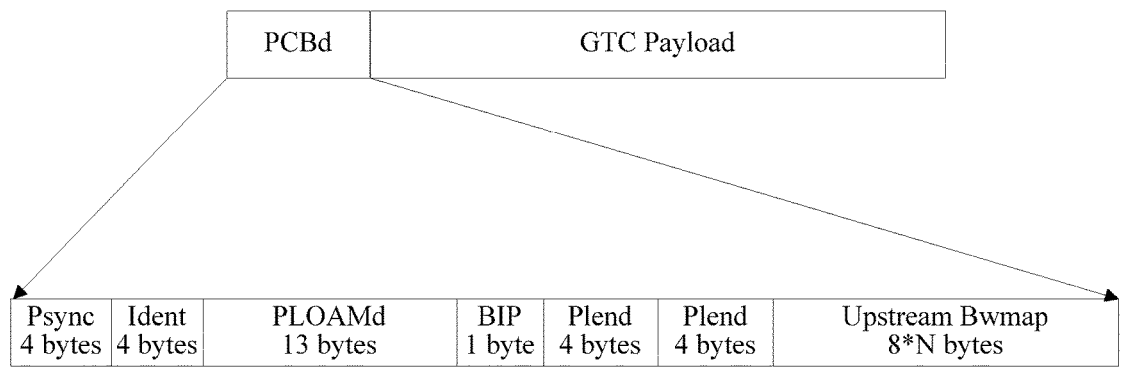
FIG. 4A is a schematic structural diagram of a GPON TC (GTC) frame according to an embodiment of the present disclosure.
Figure 4B:
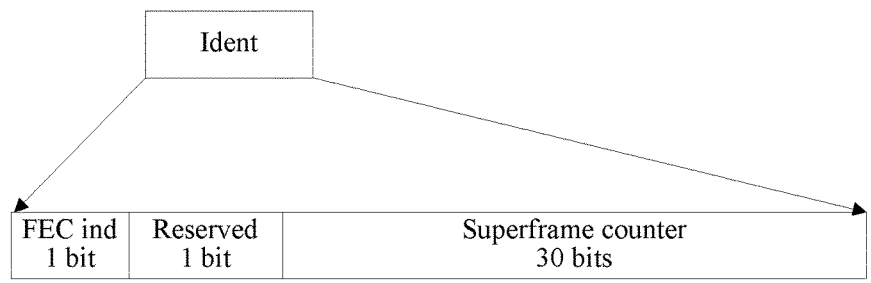
FIG. 4B is a schematic structural diagram of an Ident field of a GTC frame according to an embodiment of the present disclosure.

A physical synchronization field designated as Psync, which has four bytes in total, is located at a start position of each PCBd, and is used for frame synchronization, that is, the ONU determines a start position of a downstream frame according to the Psync;

An Ident field, which has four bytes in total, and is used to identify indication information of a frame structure, where for a specific structure of the Ident field, refer to FIG. 4B, where a highest 1 bit is used to indicate a downstream FEC state (designated as FEC ind), and low 30 bits are a superframe counter;

A PLOAM downstream field designated as PLOAMd, which has 13 bytes in total, and is used to carry a downstream PLOAM message to complete management functions such as ONU activation, encryption configuration, key management, and alarm notification, where for a specific structure of the PLOAM message, refer to a specification in the standard G.984.3, and details are not described herein again;

A bit interleaved parity (BIP) field, which has one byte in total, and is used to perform BIP on all bytes (except an FEC parity field) after a BIP field of a previous GTC frame, where BIP information carried in the BIP field covers all transmission bytes except an FEC parity bit (if FEC parity exists). After FEC is completed (if the FEC parity exists), a receive end should calculate BIP values of all received bytes after the previous BIP field, where the received bytes should not cover an FEC parity bit, and compare the BIP values with a received BIP value in order to estimate a quantity of errors on a link;

A Plend, which has four bytes in total, where to ensure robustness, the Plend field is transmitted twice. A specific structure is shown in FIG. 4E. The Plend field mainly includes a bandwidth mapping length (Blen) field and an Alen field, where the Blen field is used to indicate a quantity of bandwidth bitmap (BWmap) bytes, the Alen field is used to indicate a length of an ATM block, and because the Alen field is not used in the GPON standard G.984, default values of all bits in the Alen field are 0; and An upstream BWmap (designated as Upstream BWmap) field, where a length of the field is variable, the Blen field is used to indicate quantity information of the field, and a length of each BWmap is eight bytes.

Figure 4C:
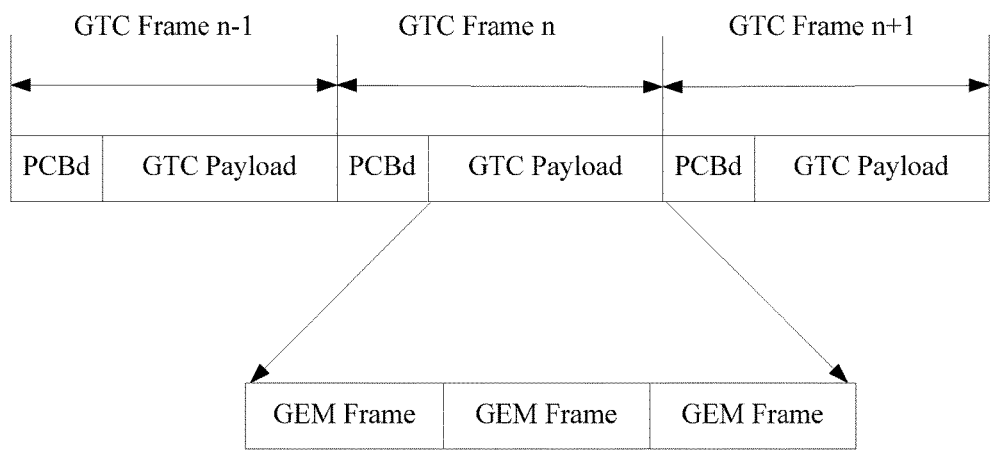
FIG. 4C is a schematic structural diagram of a data stream consisting of multiple GTC frames according to an embodiment of the present disclosure.
Figure 4D:
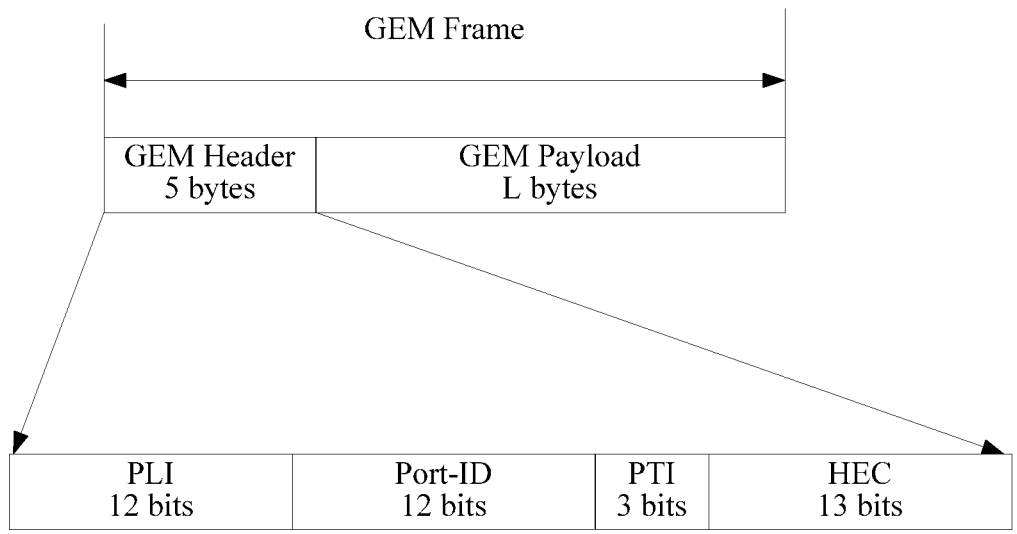
FIG. 4D is a schematic structural diagram of a GEM frame according to an embodiment of the present disclosure.
Figure 4E:
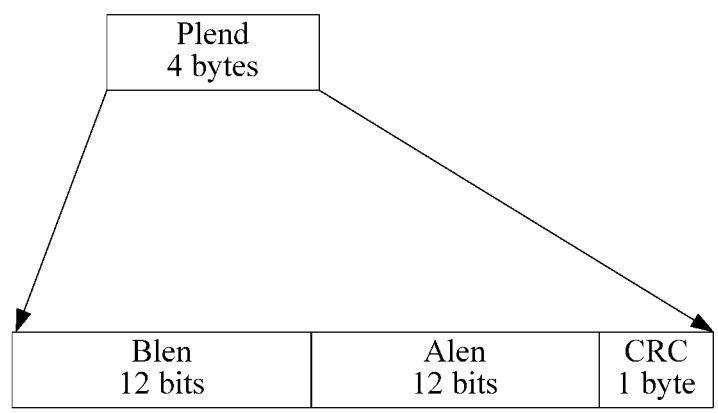
FIG. 4E is a schematic structural diagram of a payload length downstream (Plend) field of a GTC frame according to an embodiment of the present disclosure.

As shown in FIG. 4C, a GTC payload consists of several GEM frames. As shown in FIG. 4D, the GEM frame consists of a frame header (designated as GEM Header) and a payload (designated as GEM Payload).

FIG. 4B to FIG. 4E show specific content of the fields of the GTC frame, and for a specific definition of the GTC frame, refer to the description in the standard G.984.3, and details are not described herein again.

It should be noted that in Embodiment 1 of the present disclosure, when the first TC frame and the second TC frame are applied in the GPON system, specific structures of the first TC frame and the second TC frame are similar to the structure of the foregoing GTC frame, where all the structures include PCBd and a payload field. However, in this embodiment of the present disclosure, a sum of frame lengths of the first TC frame and the second TC frame is 125 μs, and a quantity of bytes of the first TC frame or the second TC frame is less than a quantity of bytes of the GTC frame, that is, in this embodiment of the present disclosure, a length of the payload field of the first TC frame or the second TC frame is less than a length of the payload field of the GTC frame.

It should be further noted that in Embodiment 1 of the present disclosure, an Alen field in a Plend field of the first TC frame complies with a specification in the other approaches, and a default value of the Alen field is 0. However, an Alen field of the second TC frame is used to indicate a frame length of the second TC frame.

The GPON is used as an example. In this embodiment of the present disclosure, the sum of the frame lengths of the first TC frame and the second TC frame is 125 μs, the downstream rate of the first TC frame is 2.488 Gbps, and the downstream rate of the second TC frame is 1/N of 2.488 Gbps, for example, 622 Mbps. Further, a quantity of bytes of the first TC frame and a quantity of bytes of the second TC frame may be obtained by calculating the frame lengths of the two frames. For example, assuming that the frame length of the first TC frame is 60.7 μs and the frame length of the second TC frame is 64.3 μs, the frame length of the first TC frame is 18,880 bytes and the second TC frame is 5,000 bytes. Certainly, the frame length of the first TC frame and the frame length of the second TC frame may be specified by an OLT, and this is not limited in this embodiment of the present disclosure.

It should be understood that, an example in which the frame length of the first TC frame is 18,880 bytes is used. A quantity of bytes occupied by the PCBd of the first TC frame is the same as that of an existing GTC frame, but a quantity of bytes occupied by a payload part of the first TC frame is less than a quantity of bytes of the payload of the GTC frame that is specified in the standard.

Figure 4F:
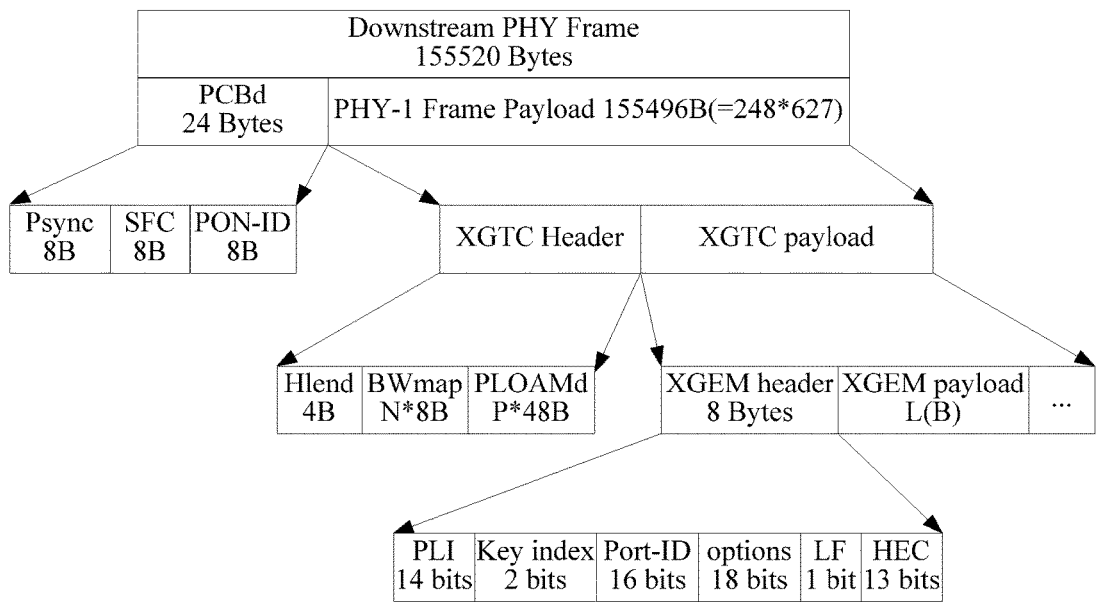
FIG. 4F is a schematic structural diagram of a a physical (PHY) frame according to an embodiment of the present disclosure.

For the XG-PON system, a framing sub-layer of a TC layer is responsible for generating the first TC frame and the second TC frame. A frame structure of the first TC frame or the second TC frame is similar to the structure of the PHY frame that is defined in the existing standard G.987.3. For details, refer to the following description. The structure of the PHY frame is shown in FIG. 4F, and a downstream PHY frame consists of a PCBd and a payload part (designated as Payload) of the PHY frame, where the PCBd consists of the following fields:

A Psync field, which occupies eight bytes (designated as 8B) and has 64 bits in total, is located at a start position of each PCBd, and is used for frame synchronization, that is, the ONU determines a start position of a downstream frame according to the Psync, where a value of the field is set to 0xC5E5 1840 FD59 BB49;

A superframe counter (designated as SFC) field, which occupies eight bytes (designated as 8B), has 64 bits in total, and includes a 51-bit superframe counter and a 13-bit header error control (HEC) field (not shown), where as compared with a previous PHY frame, a value of an SFC of each PHY frame is increased, when a value of an SFC of a PHY frame reaches a maximum value, an SFC of a next PHY frame is calculated from 0. For specific content, refer to description in the standard G.987.3, and details are not described herein again; and A PON-ID field, including 51-bit PON identification information and a 13-bit HEC field, where a PON-ID is set by the OLT, and a default value of the PON-ID is 51 zeros.

The payload part of the PHY frame is used to bear an XGTC frame, where the XGTC frame consists of an XGTC frame header (designated as XTGC Header) and an XGTC payload. The XGTC frame header includes three subfields, which are sequentially Hlend of 4 bytes, BWmap of N*8bytes, and PLOAMd of P*48bytes. The payload of the XGTC frame bears multiple XGEM frames, where an XGEM frame consists of an XGEM header of 8 bytes and an XGEM payload L bytes. The XGEM header includes six fields, which are sequentially Payload Length Indicator (PLI) of 14 bits, Key index of 2 bits, Port-ID of 16 bits, options of 18 bits, LF of 1 bit, and HEC of 13 bits. For meanings of the fields, refer to the description in the standard G.987.3, and details are not described herein again.

Figure 5A:
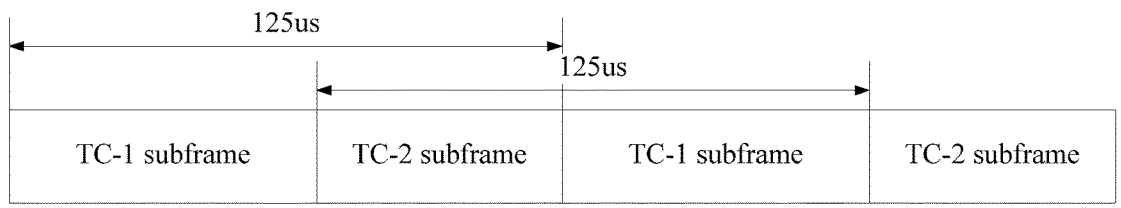
FIG. 5A is a schematic diagram of a first TC frame and a second TC frame according to an embodiment of the present disclosure.
Figure 5B:
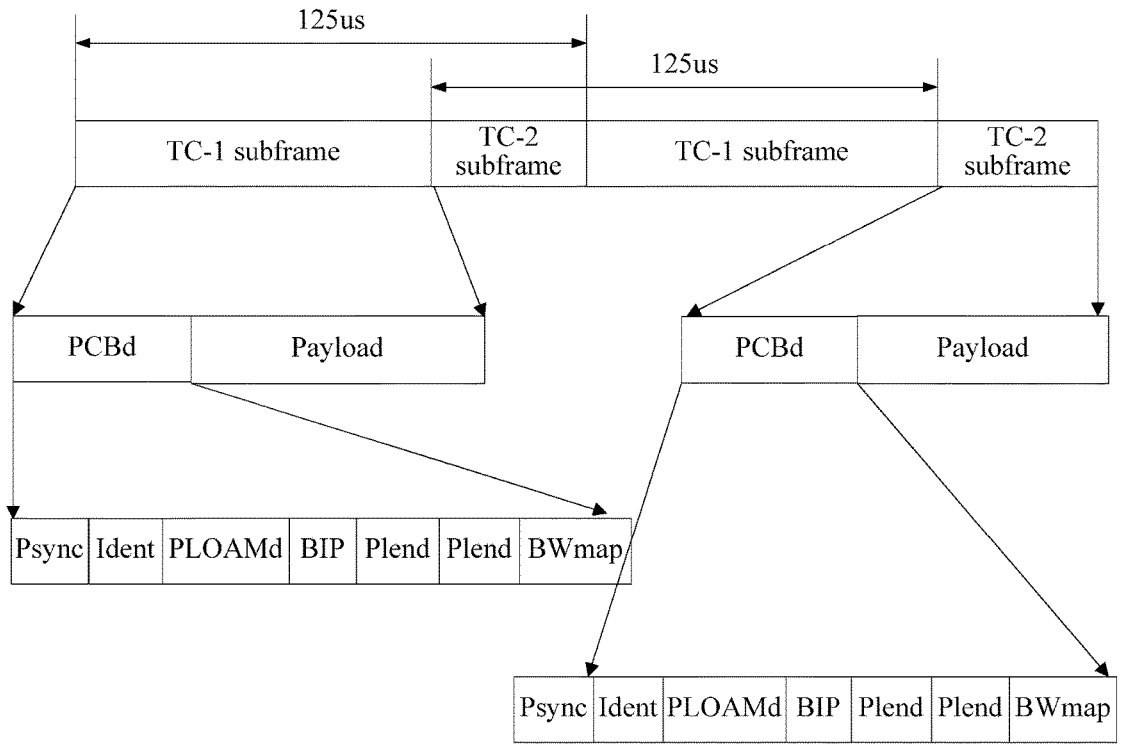
FIG. 5B is a schematic diagram of specific structures of a first TC frame and a second TC frame according to an embodiment of the present disclosure.

As shown in FIG. 5A or FIG. 5B, the sum of the frame lengths of the first TC frame (designated as TC-1 subframe) and the second TC frame (designated as TC-2 subframe) is 125 μs, and an interval between frame headers of second TC frames is 125 μs. The XG-PON is used as an example. In this embodiment of the present disclosure, the sum of the frame lengths of the first TC frame and the second TC frame is 125 μs, the downstream rate of the first TC frame is 10 Gbps, and the downstream rate of the second TC frame is 2.488 Gbps. Further, a quantity of bytes of the first TC frame and a quantity of bytes of the second TC frame may be obtained by calculating the frame lengths of the two frames. For example, assuming that the frame length of the first TC frame is 60.7 μs and the frame length of the second TC frame is 64.3 μs, the frame length of the first TC frame is 75,520 bytes and the second TC frame is 20,000 bytes. Certainly, the frame length of the first TC frame and the frame length of the second TC frame may be specified by the OLT, and this is not limited in this embodiment of the present disclosure.

It should be understood that, in an example in which the frame length of the first TC frame is 75,520 bytes, a quantity of bytes occupied by the PCBd of the first TC frame is the same as that of an existing PHY frame, but a quantity of bytes occupied by a payload part of the first TC frame is less than a quantity of bytes of the payload of the PHY frame that is specified in the standard. It should be noted that in a framing process, the OLT multiplexes existing logic at a TC adaptation layer, and the first TC frame and the second TC frame are separately generated at a framing sub-layer, and values of BIP fields of the first TC frame and the second TC frame are separately calculated.

It should be noted that, for the second TC frame, a calculation range of a first BIP of the second TC frame is data from a frame header of the second TC frame to the BIP field, and a calculation range of another BIP is data of the second TC frame after a BIP field of a previous second TC frame and before the BIP field of the current second TC frame.

For the first TC frame, the BIP field protects data of an entire TC frame (including the first TC frame and the second TC frame), that is, data obtained after the first TC frame and the second TC frame are mapped to the rate of 2.488 Gbps. A value of a BIP field of an $N^{th}$ first TC frame is generated according to a BIP calculation method using the following three parts a part after a BIP field of an $(N-1)^{th}$ first TC frame, an $(N-1)^{th}$ second TC frame, and a part before the BIP field of the $N^{th}$ first TC frame.

For example, a BIP value of a $2^{nd}$ first TC frame is based on a part after a BIP field of a $1^{st}$ first TC frame, a $1^{st}$ second TC frame, and a part before a BIP field of the $2^{nd}$ first TC frame, and so on.

For specific content of step 302, the GPON is used as an example for description. The second TC frame corresponds to a rate of 1/N of 2.488 Gbps. In an example in which a line rate of the second TC frame is 622 Mbps, for accurate timing, a bit width of the second TC frame is N times as large as that of a first TC frame. As shown in this embodiment of the present disclosure, the rate of the second TC frame is 622 Mbps, which occupies 5,000 bytes (which is obtained by calculating based on the assumption that the frame length of the first frame is 60.7 μs and the frame length of the second frame is 64.7 μs) in total. Because a downstream processing rate of a transmitter of an existing OLT is 2.488 Gbps, before the second TC frame is transmitted, a downstream frame whose downstream rate is 622 Mbps needs to be mapped to a downstream frame whose rate is 2.488 Gbps, that is, a third TC frame. A frame length of the third TC frame is 5,000*4=20,000 bytes such that a total quantity of bytes of the first TC frame and the third TC frame is 18,880+20,000=38,880 bytes, which is exactly a total quantity of bytes of the TC frame of the GPON in the other approaches.

Further, a specific implementation method for identifying one bit using four bits is as follows. For example, a bit "1" is mapped to "1100", and a bit "0" is mapped to "0011". Certainly, another mapping method may also be used, for example, a bit "1" is mapped to "1111", and a bit "0" is mapped to "0000", as long as four bits to which 0 is mapped and four bits to which 1 is mapped represent different values. Certainly, if the second TC frame corresponds to 311 Mbps, 1244 Mbps, or another rate lower than 2.488 Gbps, the bit width of the second TC frame is an integer multiple of that of the first TC frame. For example, the bit width of the second TC frame is eight times or two times as large as that of first TC frame. Correspondingly, a specific implementation manner of bit mapping is identifying one bit using eight bits. For example, a bit "1" is mapped to "11110000", and a bit "0" is mapped to "00001111". Alternatively, two bits are used to identify one bit. For example, a bit "1" is mapped to "11", and a bit "0" is mapped to "00".

In this embodiment of the present disclosure, for the GPON, the frame length of the third TC frame and the frame length of the first TC frame are 38,880 bytes in total, and the 38,880 bytes are transmitted, as a whole, to an optical transmitter using a media access control (MAC) module of the OLT, and the optical transmitter transmits the 38,880 bytes to multiple ONUs.

A person of ordinary skill in the art should understand that, for the XG-PON system, the bit mapping is performed on the second TC frame, and a principle and a process of the bit mapping are the same as that in the foregoing description of the GPON system. A person of ordinary skill in the art may learn, without any creative effort, how to perform bit mapping in the XG-PON system according to the foregoing description of the GPON.

It should be understood that, for the XG-PON, the frame length of the third TC frame and the frame length of the first TC frame are 155,520 bytes in total, and the 155,520 bytes are transmitted, as a whole, to an optical transmitter using a MAC module of the OLT, and the optical transmitter transmits the 155,520 bytes to multiple ONUs.

In this embodiment of the present disclosure, preferably, the frame length of the first TC frame is an integer multiple of 239 bytes. Further, in the GPON system, if the frame length of the first TC frame is an integer multiple of 239 bytes, in this embodiment of the present disclosure, an FEC coding procedure of the first TC frame may be simplified such that a solution for processing FEC decoding by an ONU whose receive rate is 2.488 Gbps is the same as a solution in the other approaches.

In this embodiment of the present disclosure, preferably, the frame length of the first TC frame is an integer multiple of 248 bytes. Further, in the XG-PON system, if the frame length of the first TC frame is an integer multiple of 248 bytes, in this embodiment of the present disclosure, an FEC coding procedure of the first TC frame may be simplified such that a solution for processing FEC decoding by an ONU whose receive rate is 10 Gbps is the same as a solution in the other approaches.

Before step S302, the method further includes the following step.

Step S301a: Perform scrambling on the second TC frame.

Further, a scramble pattern (SP) used by a current second TC frame is calculated using a value of an Alen field of a previous second TC frame, where the Alen field is used to indicate the frame length of the second TC frame. For a specific scrambling method, refer to a scrambling technology existing in other approaches, and details are not described herein again.

Before step S302, the method further includes the following step.

Step S301b: Perform first coding on the second TC frame.

Further, the first coding may be RS (255,239) coding, RS (248,216) coding, LDPC coding, or cascade FEC coding, or another FEC coding recorded in the other approaches, and if a high-order coding manner is used, a coding gain may be obtained, and details are not described herein again.

Before step S303, the method further includes the following step.

Step S301c: Insert a frame header of a pseudo GEM frame into the third TC frame. A beneficial effect of the step is that an original ONU (the original ONU refers to an ONU whose receive rate is 2.488 Gbps in the GPON system, or an ONU whose receive rate is 10 Gbps in the XG-PON) may not generate a GEM frame loss alarm when receiving the third TC frame.

The step S301c further includes the following steps.

Step S301c1: Insert a placeholder into the third TC frame.

The placeholder means occupying a particular position and then adding specific content to the particular position. For ease of description, for the GPON system, the ONU whose receive rate is 2.488 Gbps is named the original ONU, and an ONU whose receive rate is lower than 2.488 Gbps is a new ONU. The frame header of the pseudo GEM frame is inserted into the third TC frame according to a particular rule.

Figure 6:
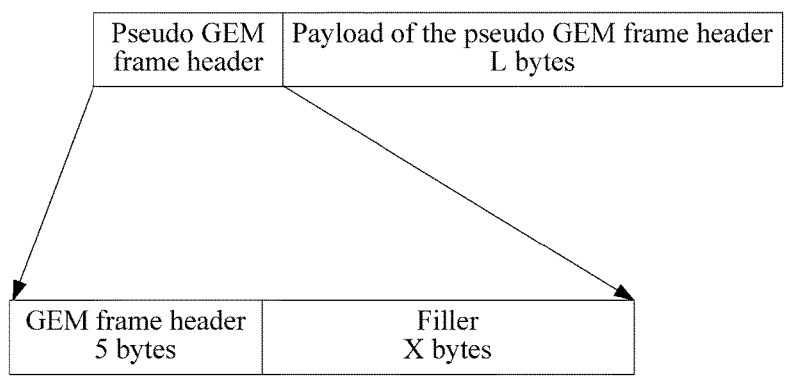
FIG. 6 is a schematic structural diagram of a pseudo GEM frame according to an embodiment of the present disclosure.

A frame structure of the pseudo GEM frame is shown in FIG. 6. The pseudo GEM is a 5-byte GEM frame header plus an X-byte filler (X is an integer greater than or equal to 0, which may be arbitrarily set by the OLT), and a length of a pseudo GEM frame payload is L bytes. A value of a PLI field in the pseudo GEM frame header is L+X bytes. A GEM Port-ID of a pseudo GEM frame header that is to be inserted is set to a particular identifier such that the original ONU cannot identify the Port-ID after receiving the pseudo GEM frame header carrying the particular Port-ID, but directly discards the pseudo GEM frame header without performing parsing. The new ONU can discard the pseudo GEM frame header and reserve content of a third TC frame after receiving the third TC frame into which the pseudo GEM frame header is inserted.

Further, a placeholder of a first pseudo GEM frame header is inserted after the first TC frame and before the third TC frame to construct a first pseudo GEM frame, and similarly, a second pseudo GEM frame is then constructed. A value of L should satisfy that a relative small value is selected between a maximum value of a PLI field of the pseudo GEM frame header and a frame length that is estimated, according to first FEC code, for the third TC frame that is not encapsulated into the pseudo GEM frame, and a value of a frame length of an entire pseudo GEM frame, that is, L+X+5, is required to be an integer multiple of a codeword length of the first FEC code. The entire pseudo GEM frame includes the inserted pseudo GEM frame header, a fragment of the third TC frame that has undergone the bit mapping, and a parity bit of the first FEC code. The fragment of the third TC frame is obtained by fragmenting the third TC frame according to a data payload length of a first FEC codeword, where a length of the last fragment may be less than a payload length of one codeword, and for the FEC, refer to existing processing of shortening a codeword.

Step S301c2: Perform scrambling on the third TC frame into which the placeholder is inserted.

Step S301c3: Fill the placeholder using the pseudo GEM frame header.

The pseudo GEM frame header is used to replace the placeholder, and BIP calculation is performed on the pseudo GEM frame header and a fragment of the scrambled third TC frame, and a result of the BIP calculation is used to calculate a BIP value of a next first TC frame.

The method further includes the following step.

Step S301d: Perform second coding on the first TC frame and the third TC frame into which the pseudo GEM frame header is inserted, where the second coding is one of RS (255,239) coding, RS (248,216) coding, LDPC coding, or cascade FEC coding. A beneficial effect of step S301d is that the original ONU may not generate an FEC alarm when receiving the third TC frame.

The method further includes the following step.

Step S301e: Perform third scrambling processing on the first TC frame and the third TC frame that have undergone the second coding.

In this embodiment of the present disclosure, the framing method is provided on a sending side, and in the framing method, a line rate corresponding to a second TC frame is lower than a line rate of a first TC frame such that a rate of a receiver on a receiving side is decreased and a bandwidth of the receiver is narrowed, thereby decreasing an optical link loss and increasing an optical power budget.

Embodiment 2

Figure 7A:
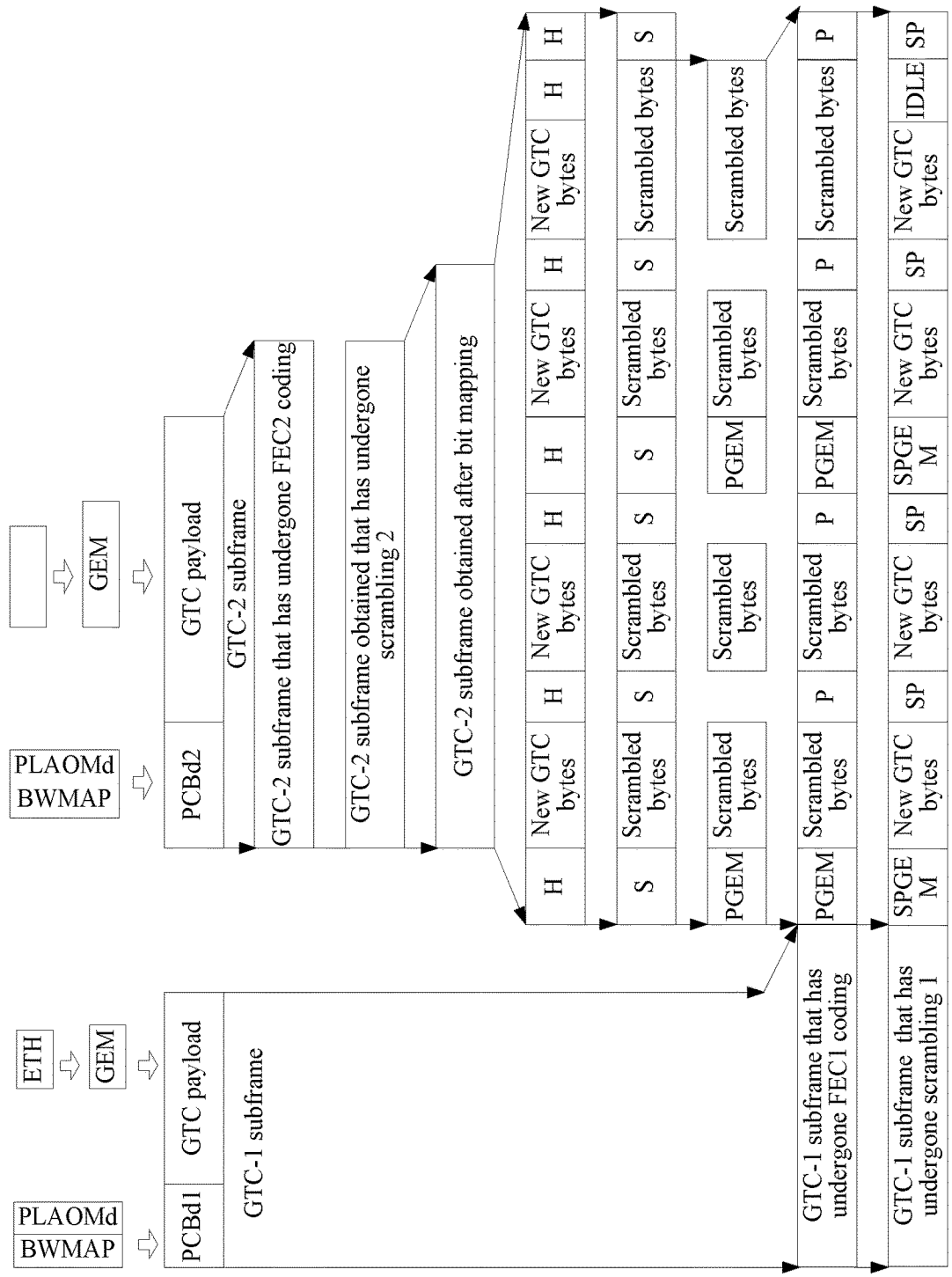
FIG. 7A is a schematic diagram of framing in a PON according to an embodiment of the present disclosure.
Figure 7B:
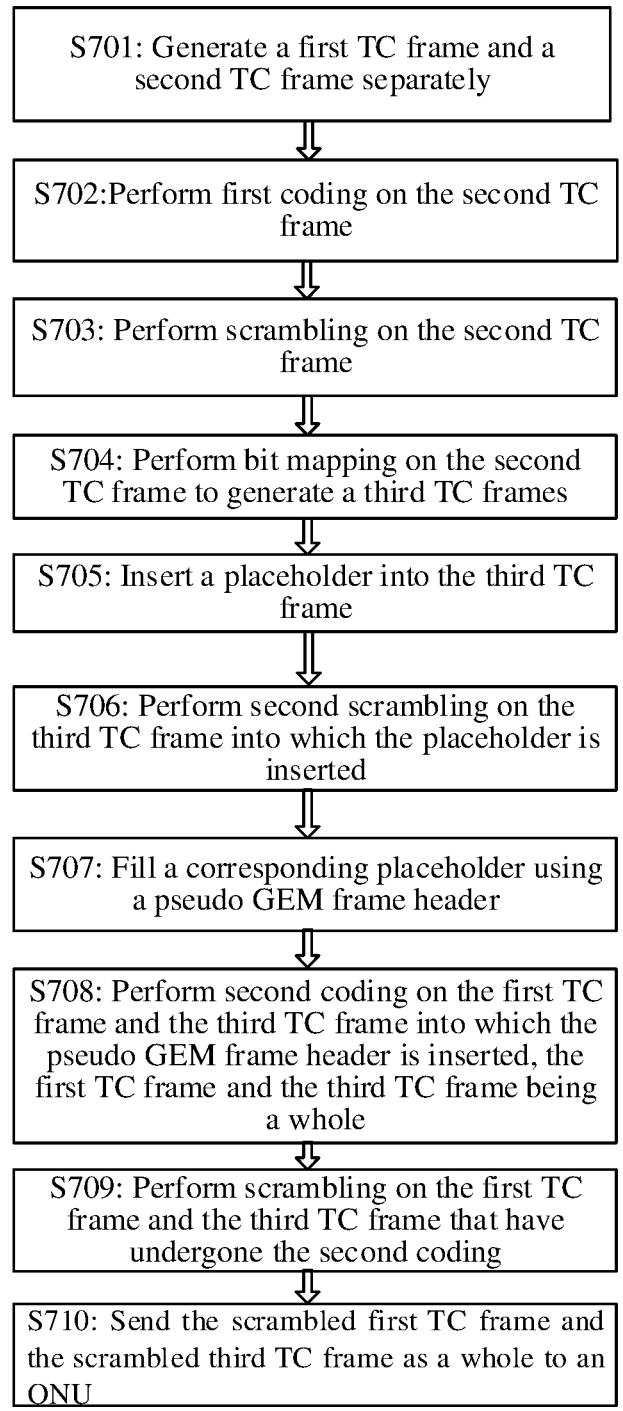
FIG. 7B is a schematic flowchart of another framing method in a PON according to an embodiment of the present disclosure.

The following describes a framing method in a PON according to an embodiment of the present disclosure in detail with reference to FIGS. 7A and 7B. As shown in FIG. 7B, FIG. 7B shows a framing method according to this embodiment of the present disclosure. The method includes the following steps.

Step S701: Generate a first TC frame and a second TC frame separately, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1.

Step S702: Perform first coding on the second TC frame, where the first coding may be RS (255,239), or may be another coding manner such as RS (255,151) coding, RS (248,216) coding, LDPC coding, cascade FEC coding, or another FEC coding existing in the other approaches, and details are not described herein again.

Step S703: Perform scrambling on the second TC frame. Scrambling is same as in the other approaches, that is, an SP used by the current second TC frame is calculated using a value of an Alen field in a previous second TC frame.

Step S704: Perform bit mapping on the second TC frame to generate a third TC frame, where the bit mapping refers to identifying each bit of the second TC frame using N bits. Further, the second TC frame corresponds to a rate of 1/N of 2.488 Gbps. In an example in which a line rate of the second TC frame is 622 Mbps, for accurate timing, a bit width of the second TC frame is N times as large as that of the first TC frame. As shown in this embodiment of the present disclosure, the rate of the second TC frame is 622 Mbps, which occupies 5,000 bytes (which is obtained by calculating based on the assumption that the frame length of the first frame is 60.7 μs and the frame length of the second frame is 64.3 82 s) in total. Because a downstream processing rate of a transmitter of an existing OLT is 2.488 Gbps, before the second TC frame is transmitted, the bit mapping needs to be performed, that is, a downstream frame whose rate is 622 Mbps is mapped to a downstream frame whose rate is 2.488 Gbps. A frame length of the third TC frame obtained after the mapping is 5,000*4=20,000 bytes such that a total quantity of bytes of the first TC frame and the third TC frame is 18,880+20,000=38,880 bytes, which is exactly a total quantity of bytes of a GTC frame of a GPON in the other approaches.

Step S705: Insert a placeholder into the third TC frame.

Step S706: Perform second scrambling on the third TC frame into which the placeholder is inserted.

Step S707: Fill a corresponding placeholder using a pseudo GEM frame header.

Step S708: Perform second coding on the first TC frame and the third TC frame into which the pseudo GEM frame header is inserted, the first TC frame and the third TC frame being a whole, where the second coding may be RS (255, 239) coding, or may be another coding manner such as RS (255,151) coding, RS (248,216) coding, LDPC coding, cascade FEC coding, or another FEC coding existing in the other approaches, and details are not described herein again.

For detailed description of step S705 to step S708, refer to the description in Embodiment 1, and details are not described herein again.

Step S709: Perform scrambling on the first TC frame and the third TC frame that have undergone the second coding.

Step S710: Send the scrambled first TC frame and the scrambled third TC frame as a whole to an ONU.

It should also be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In this embodiment of the present disclosure, the framing method is provided on a sending side, and in the framing method, a line rate corresponding to a second TC frame is lower than a line rate of a first TC frame such that a rate of a receiver on a receiving side is decreased and a bandwidth of the receiver is narrowed, thereby decreasing an optical link loss and increasing an optical power budget.

Embodiment 3

Figure 8:
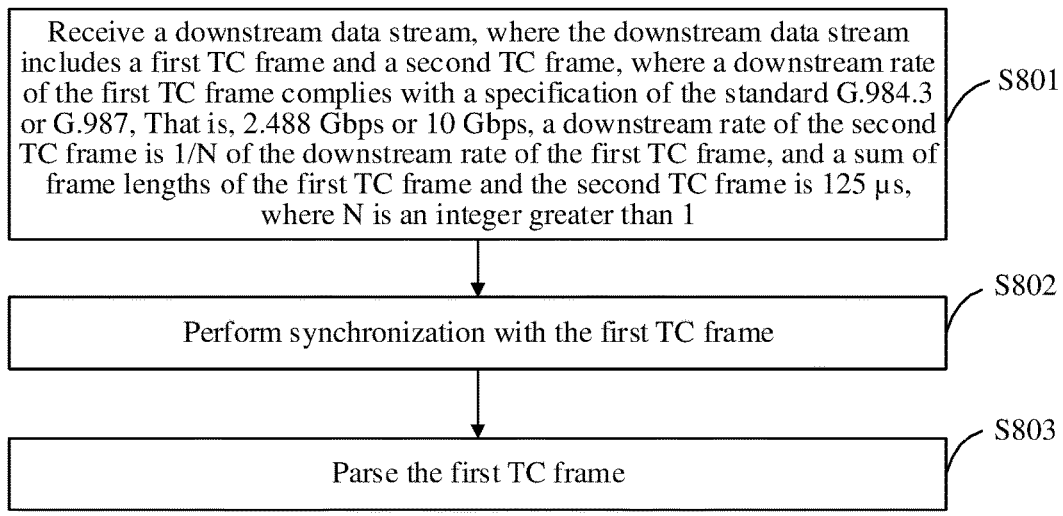
FIG. 8 is a schematic flowchart of a deframing method in a PON according to an embodiment of the present disclosure.

FIG. 8 is a schematic flowchart of a deframing method in a PON according to an embodiment of the present disclosure. The method may be applied in a GPON or an XG-PON. When the method is applied in a GPON system, the method is performed by an ONU whose receive rate is 2.488 Gbps. When the method is applied in an XG-PON system, the method is performed by an ONU whose receive rate is 10 Gbps. As shown in FIG. 8, the method includes the following steps.

Step S801: Receive a downstream data stream, where the downstream data stream includes a first TC frame and a second TC frame, where a downstream rate of the first TC frame complies with a specification of the standard G.984.3 or G.987, that is, 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1.

Step S802: Perform synchronization with the first TC frame.

Step S803: Parse the first TC frame.

A value of N is one of 2, 4, or 8.

An interval between frame headers of second TC frames is also 125 μs.

The method further includes the following steps (not shown).

Step S801a: Perform descrambling on the first TC frame.

Step S801b: Decode the first TC frame.

Step S801c: Discard the second TC frame.

In this embodiment of the present disclosure, performing synchronization with the first TC frame includes performing synchronization with the first TC frame according to a Psync field in PCBd of the first TC frame. For details about how to perform synchronization with the first TC frame according to the Psync, refer to description in the other approaches, and details are not described herein.

A person of ordinary skill in the art should understand that an optical receiver of the ONU receives, using a line, a data stream sent by an OLT, and the data stream is transmitted to a MAC module of the ONU for processing. The deframing method provided in this embodiment of the present disclosure is performed by the MAC module of the ONU.

It should be understood that the deframing method provided in this embodiment of the present disclosure and a framing method provided in another embodiment of the present disclosure correspond to a receiving side and a sending side, respectively. When scrambling is performed on the sending side, correspondingly, descrambling needs to be performed on the receiving side, where the descrambling and the scrambling are mutually inverse operations. For a specific technology of the scrambling or the descrambling, refer to description in the other approaches, and details are not described herein again.

It should be understood that the deframing method provided in this embodiment of the present disclosure and the framing method provided in the other embodiment of the present disclosure correspond to a receiving side and a sending side, respectively. If coding is performed on the sending side, correspondingly, decoding processing needs to be performed on the receiving side, where the decoding and the coding are mutually inverse operations.

In this embodiment of the present disclosure, discarding the second TC frame includes discarding the second TC frame according to a Port-ID field of a frame header of a pseudo GEM frame. A person of ordinary skill in the art should understand that the MAC module reads a GEM according to the Port-ID in the frame header of the GEM frame. Because the Port-ID in the pseudo GEM frame does not belong to any ONU, the ONU cannot parse the second TC frame and directly discards the second TC frame. Further, when the MAC module of the ONU determines that the Port-ID is different from a Port-ID locally recorded by the ONU, the MAC module of the ONU discards the pseudo GEM frame header and the second TC frame that is after the pseudo GEM frame header.

In this embodiment of the present disclosure, the deframing method is provided on a sending side. In the deframing method, a line rate corresponding to a second TC frame is lower than a line rate of a first TC frame such that compared with the other approaches, a rate of a receiver on a receiving side is decreased and a bandwidth of the receiver is narrowed, thereby decreasing an optical link loss and increasing an optical power budget.

Embodiment 4

Figure 9:
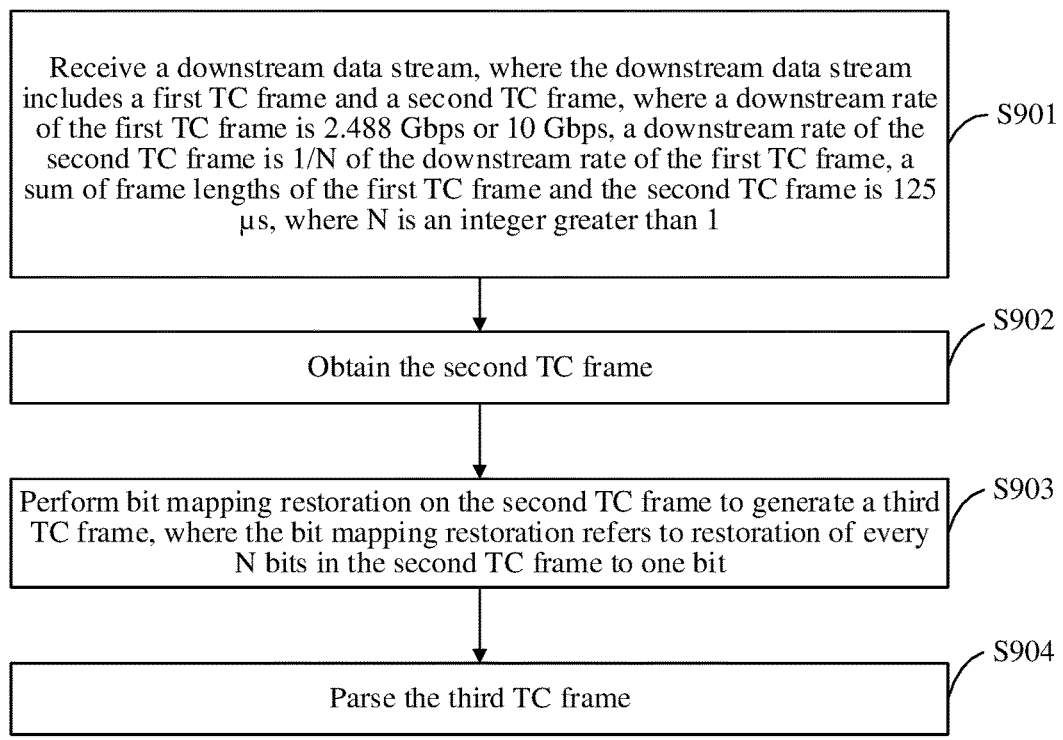
FIG. 9 is a schematic flowchart of another deframing method in a PON according to an embodiment of the present disclosure.

FIG. 9 is a schematic flowchart of another deframing method in a PON according to an embodiment of the present disclosure. The method may be applied in a GPON or an XG-PON. When the method is applied in a GPON system, the method is performed by an ONU whose receive rate is 1/N of 2.488 Gbps. When the method is applied in an XG-PON system, the method is performed by an ONU whose receive rate is 1/N of 10 Gbps. As shown in FIG. 9, the method includes the following steps.

Step S901: Receive a downstream data stream, where the downstream data stream includes a first TC frame and a second TC frame, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1.

Step S902: Obtain the second TC frame.

Step S903: Perform bit mapping restoration on the second TC frame to generate a third TC frame, where the bit mapping restoration refers to restoration of every N bits in the second TC frame to one bit.

Step S904: Parse the third TC frame.

Optionally, the method further includes the following steps (not shown).

Step S902a: Perform descrambling on the second TC frame.

Step S902b: Decode the second TC frame.

In this embodiment of the present disclosure, an optical receiver of the ONU receives a downstream data stream, and the downstream data stream is transmitted to a MAC module of the ONU for processing, and the MAC module receives the downstream data stream and parses the downstream data stream. When the MAC module identifies a Psync field in a PCBd field of the second TC frame, the MAC module performs synchronization with the second TC frame according to the Psync field in the PCBd field.

Obtaining the second TC frame includes removing, according to frame length information of the second TC frame that is indicated by an Alen field in a PCBd field of the second TC frame, a pseudo GEM frame from the received second TC frame, to obtain the second TC frame.

A person of ordinary skill in the art should understand that bit mapping is performed on the second TC frame on a sending side, and the second TC frame needs to be restored on a receiving side, that is, the bit mapping and the bit mapping restoration are mutually inverse operations.

A person of ordinary skill in the art should understand that the deframing method provided in this embodiment of the present disclosure and a framing method provided in another embodiment of the present disclosure correspond to a receiving side and a sending side, respectively. When scrambling is performed on the sending side, correspondingly, descrambling needs to be performed on the receiving side, where the descrambling and the scrambling are mutually inverse operations. For details about the scrambling or the descrambling, refer to description in the other approaches, and details are not described herein again.

A person of ordinary skill in the art should understand that the deframing method provided in this embodiment of the present disclosure and the framing method provided in the other embodiment of the present disclosure correspond to a receiving side and a sending side, respectively. If coding is performed on the sending side, correspondingly, decoding processing needs to be performed on the receiving side, where the decoding and the coding are mutually inverse operations.

In this embodiment of the present disclosure, the deframing method is provided on a receiving side. In the deframing method, a line rate corresponding to a second TC frame is lower than a line rate of a first TC frame such that a rate of a receiver on a receiving side is decreased and a bandwidth of the receiver is narrowed, thereby decreasing an optical link loss and increasing an optical power budget.

Embodiment 5

Figure 10:
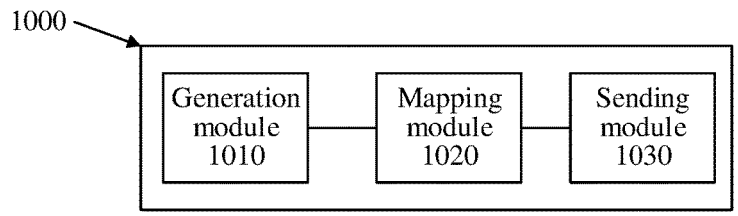
FIG. 10 is a schematic structural diagram of a framing apparatus in a PON according to an embodiment of the present disclosure.

FIG. 10 is a schematic structural diagram of a framing apparatus 1000 in a PON according to an embodiment of the present disclosure. Referring to FIG. 10, the apparatus 1000 includes a generation module 1010 configured to generate a first TC frame and a second TC frame separately, where a downstream rate of the first TC frame complies with a specification of the standard G.984.3 or G.987.3, a downstream rate of the second TC frame is 1/N of the downstream rate of the first TC frame, and a sum of frame lengths of the first TC frame and the second TC frame is 125 μs, where N is an integer greater than 1, a mapping module 1020 configured to perform bit mapping on the second TC frame to generate a third TC frame, where the bit mapping refers to identifying each bit of the second TC frame using N bits, and a sending module 1030 configured to send the first TC frame and the third TC frame to an ONU.

Optionally, the apparatus 1000 further includes a scrambling module (not shown), where the scrambling module is configured to perform scrambling on the second TC frame.

Optionally, the apparatus 1000 further includes a coding module (not shown), where the coding module is configured to perform first coding on the second TC frame, where the first coding is one of RS (255,239) coding, RS (248,216) coding, LDPC coding, or cascade FEC coding.

Optionally, the apparatus 1000 further includes a processing module (not shown), where the processing module is configured to insert a pseudo GEM frame header into the third TC frame.

The processing module is further configured to insert a placeholder into the third TC frame, perform scrambling on the third TC frame into which the placeholder is inserted, and fill the placeholder using the pseudo GEM frame header.

Optionally, the coding module is further configured to perform second coding on the first TC frame and the third TC frame into which the pseudo GEM frame header is inserted, where the second coding is one of RS (255,239) coding, RS (248,216) coding, LDPC coding, or cascade FEC coding.

Optionally, the scrambling module is further configured to perform scrambling on the first TC frame and the third TC frame that have undergone the second coding.

It should be noted that specific actions performed by modules in Embodiment 5 are steps in the method in Embodiment 1 or 2 above, and the specific actions and the steps have a same effect. Details are not described herein again.

By means of the framing apparatus 1000 in a PON according to this embodiment of the present disclosure, a line rate corresponding to a second TC frame generated by the apparatus 1000 is lower than a line rate of a first TC frame such that compared with the other approaches, a rate of a receiver on a receiving side is decreased and a bandwidth of the receiver is narrowed, thereby decreasing an optical link loss and increasing an optical power budget.

Further, the framing apparatus 1000 may be a MAC processing module of an OLT. For example, for the MAC processing module, a field programmable gate array (FPGA), an application specific integrated circuit (ASIC), a System-On-a-Chip (SoC), a central processing unit (CPU), a network processor (NP), a digital signal processing circuit (DSP), a micro controller unit (MCU), a programmable logic controller (PLD), or another integrated chip may be used.

Figure 11:
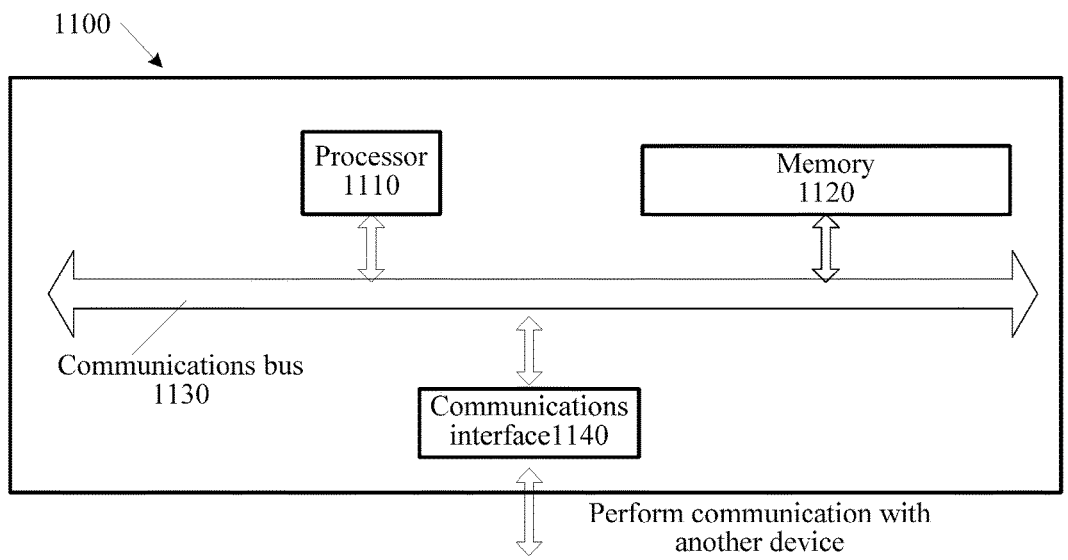
FIG. 11 is a schematic structural diagram of another framing apparatus in a PON according to an embodiment of the present disclosure.

FIG. 11 is a schematic structural diagram of a framing apparatus 1100 according to an embodiment of the present disclosure. Referring to FIG. 11, the apparatus 1100 includes a processor 1110, a memory 1120, a communications bus 1130, and a communications interface 1140. The processor 1110, the memory 1120, and the communications interface 1140 are connected to and communicate with each other using the communications bus 1130. The communications bus 1130 may be an industry standard architecture (ISA) bus, a peripheral component interconnect (PCI) bus, an extended ISA (EISA) bus, or the like. The communications bus 1130 may be classified into an address bus, a data bus, a control bus, and the like. For convenience of representation, the communications bus 1130 is represented by only one bold line in FIG. 11, but it does not represent that there is only one bus or one type of bus. The processor 1110 may be a single-core or multi-core CPU, an ASIC, or is configured as one or more integrated circuits implementing this embodiment of the present disclosure. The memory 1120 may be a read-only memory (ROM) or another type of a static storage device that can store static information and an instruction, a random access memory (RAM) or another type of a dynamic storage device that can store information and an instruction, or may be an electrically erasable programmable ROM (EEPROM), a compact disc ROM (CD-ROM) or another optical disc storage, optical disc storage (including a compact optical disc, a laser disc, an optical disc, a digital versatile disc (DVD), a BLU-RAY DISC, and the like), a magnetic disk storage medium or another magnetic storage device, or any other medium that can be used to carry or store expected program code in an instruction or data structure form and that can be accessed by a computer. The present disclosure does not limit thereto. The memory 1120 is configured to store a computer executable instruction. Further, the computer executable instruction may include program code.

The processor 1110 runs the computer executable instruction, and further, the processor 1110 is configured to perform the method steps described in Embodiment 1 or Embodiment 2.

Further, the framing apparatus 1100 may be a MAC processing module of an OLT. For example, the MAC processing module may be an FPGA, an ASIC, an SoC, or a CPU, an NP, a DSP, an MCU, a PLD, or another integrated chip.

Embodiment 6

Figure 12:
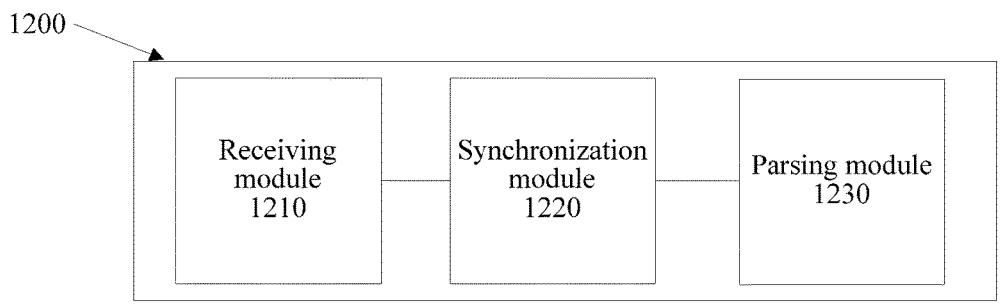
FIG. 12 is a schematic structural diagram of a deframing apparatus according to an embodiment of the present disclosure.

FIG. 12 is a schematic structural diagram of a deframing apparatus 1200 in a PON according to an embodiment of the present disclosure. Referring to FIG. 12, the apparatus 1200 includes a receiving module 1210 configured to receive a downstream data stream, where the downstream data stream includes a first TC frame and a second TC frame, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 µs, where N is an integer greater than 1, a synchronization module 1220 configured to perform synchronization with the first TC frame, and a parsing module 1230 configured to parse the first TC frame.

Optionally, the apparatus 1200 further includes a descrambling module (not shown), where the scrambling module is configured to perform descrambling on the first TC frame.

Optionally, the apparatus 1200 further includes a decoding module (not shown) configured to perform first decoding on the first TC frame.

Optionally, the apparatus 1200 further includes a discarding module (not shown) configured to discard the second TC frame.

In this embodiment of the present disclosure, performing synchronization with the first TC frame includes receiving the downstream data frame and parsing the downstream data frame, and performing synchronization with the first TC frame according to a Psync field in PCBd of the first TC frame, where for details about how to perform synchronization with the first TC frame according to the Psync, refer to description in the other approaches, and details are not described herein again.

Further, the discarding module is further configured to discard the second TC frame according to a Port-ID field of a pseudo GEM frame, and discard the pseudo GEM frame carrying the Port-ID and the second TC frame that is after the pseudo GEM frame when the Port-ID is different from a Port-ID locally recorded by an ONU.

A person of ordinary skill in the art should understand that an optical receiver of an ONU receives, using a line, a data stream sent by an OLT, and the data stream is transmitted to a MAC module of the ONU for processing. The deframing method provided in this embodiment of the present disclosure is further performed by the MAC module of the ONU.

It should be understood that the deframing apparatus provided in this embodiment of the present disclosure and a framing apparatus provided in another embodiment of the present disclosure correspond to a receiving side and a sending side, respectively. When scrambling is performed on the sending side, correspondingly, descrambling needs to be performed on the receiving side, where the descrambling and the scrambling are mutually inverse operations. For a specific technology of the scrambling or the descrambling, refer to description in the other approaches, and details are not described herein again.

It should be noted that specific actions performed by modules in Embodiment 6 are steps in the method in Embodiment 3 above, and the specific actions and the steps a same effect. Details are not described herein again.

Figure 13:
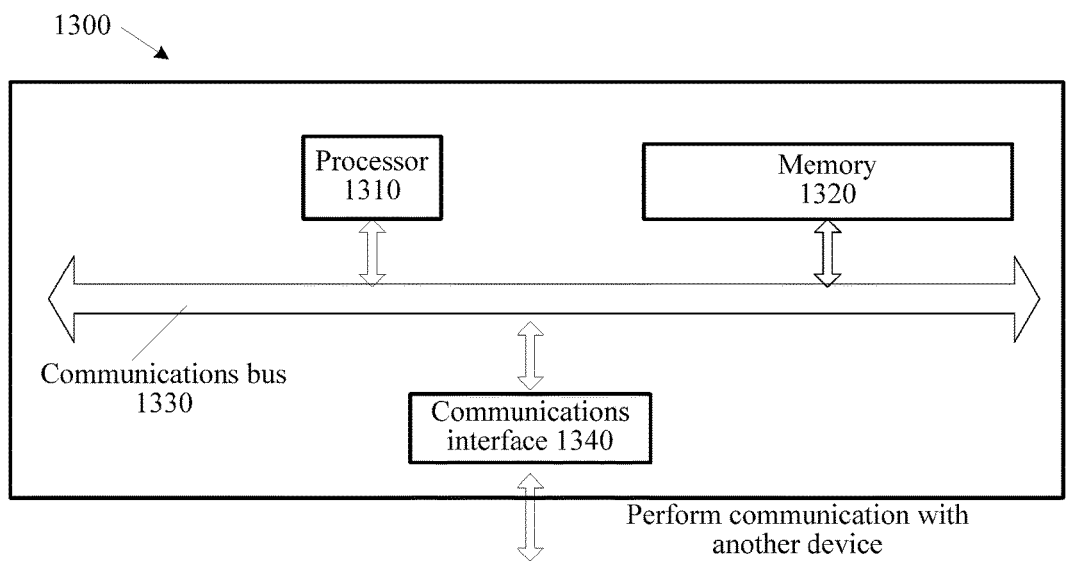
FIG. 13 is a schematic structural diagram of another deframing apparatus according to an embodiment of the present disclosure.

FIG. 13 is a schematic structural diagram of a deframing apparatus 1300 according to an embodiment of the present disclosure. Referring to FIG. 13, the apparatus 1300 includes a processor 1310, a memory 1320, a communications bus 1330, and a communications interface 1340. The processor 1310, the memory 1320, and the communications interface 1340 are connected to and communicate with each other using the communications bus 1330. The processor 1310 may be a single-core or multi-core CPU, or an ASIC, or is configured as one or more integrated circuits implementing this embodiment of the present disclosure. The memory 1320 may be a high-speed RAM, or may be a non-volatile memory, for example, a flash memory, or at least one magnetic disk storage. The memory 1320 is configured to store a computer executable instruction. Further, the computer executable instruction may include program code.

The processor 1310 runs the computer executable instruction, and further, the processor 1310 is configured to perform the method steps described in the method in Embodiment 3.

Further, in terms of physical entities, for the deframing apparatus, an FPGA, an ASIC, an SoC, a CPU, an NP, a DSP, an MCU, a PLC, or another integrated chip may be used.

In this embodiment of the present disclosure, a deframing apparatus is provided on a receiving side, and in a downstream data stream received by the apparatus, a line rate corresponding to a second TC frame is lower than a line rate of a first TC frame such that compared with a downstream rate in the other approaches, in this embodiment of the present disclosure, a rate of a receiver on a receiving side is decreased and a bandwidth of the receiver is narrowed, thereby decreasing an optical link loss and increasing an optical power budget.

Embodiment 7

Figure 14:
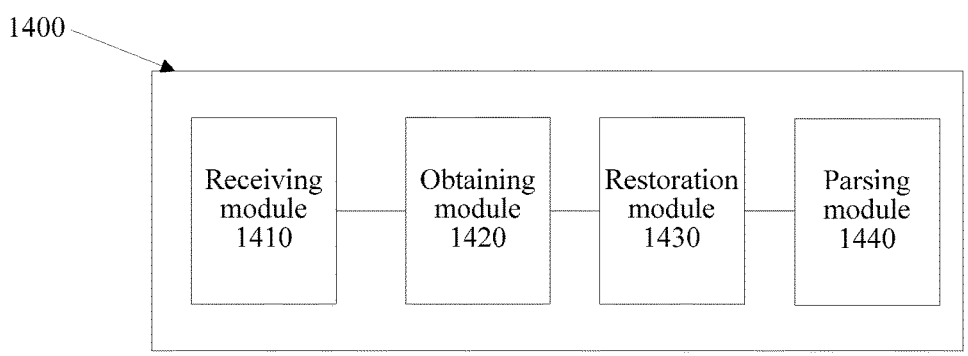
FIG. 14 is a schematic structural diagram of still another deframing apparatus according to an embodiment of the present disclosure.

FIG. 14 is a schematic structural diagram of another deframing apparatus 1400 in a PON according to an embodiment of the present disclosure. The apparatus 1400 may be applied in a GPON or an XG-PON. When the apparatus 1400 is applied in a GPON system, the apparatus 1400 is a MAC module of an ONU at 2.488 Gbps. When the apparatus 1400 is applied in an XG-PON system, the apparatus 1400 is a MAC module of an ONU at 10 Gbps. As shown in FIG. 14, the apparatus 1400 includes a receiving module 1410 configured to receive a downstream data stream, where the downstream data stream includes a first TC frame and a second TC frame, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1, an obtaining module 1420 configured to obtain the second TC frame, a restoration module 1430 configured to perform bit mapping restoration on the second TC frame to generate a third TC frame, where the bit mapping restoration refers to restoration of every N bits in the second TC frame to one bit, and a parsing module 1440 configured to parse the third TC frame.

Optionally, the apparatus 1400 further includes a descrambling module (not shown), where the descrambling module is configured to perform descrambling on the second TC frame.

Optionally, the apparatus 1400 further includes a decoding module (not shown), where the decoding module is further configured to perform decoding on the second TC frame.

In this embodiment of the present disclosure, further, an optical receiver of the ONU receives a downstream data stream, the downstream data stream is transmitted to a MAC module of the ONU for processing, and after the receiving module 1410 receives the downstream data stream, when the receiving module 1410 identifies a Psync field in a PCBd field of the second TC frame, the receiving module 1410 performs synchronization with the second TC frame according to the Psync field in the PCBd field.

Further, the obtaining module 1420 is further configured to discard a pseudo GEM frame, FEC parity data, and the first TC frame according to frame length information of the second TC frame that is identified by an Alen field in PCBd of the second TC frame to obtain the second TC frame.

A person of ordinary skill in the art should understand that bit mapping is performed on the second TC frame on a sending side, and the second TC frame needs to be restored on a receiving side, that is, the bit mapping and the bit mapping restoration are mutually inverse operations.

It should be noted that specific actions performed by modules in Embodiment 7 are steps in the method in Embodiment 4 above, and the specific actions and the steps have a same effect. Details are not described herein again.

Figure 15:
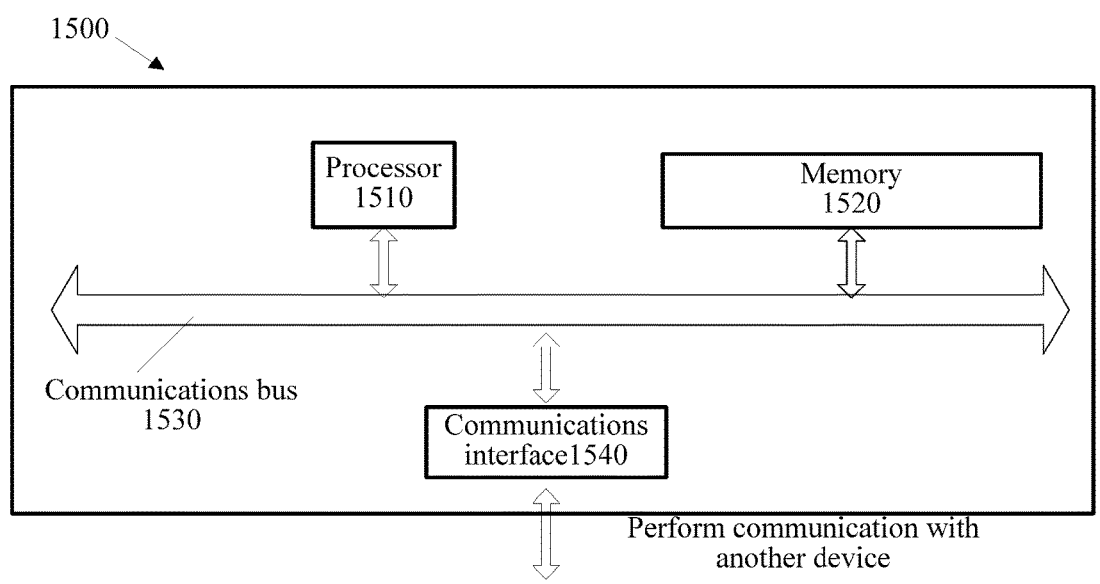
FIG. 15 is a schematic structural diagram of yet another deframing apparatus according to an embodiment of the present disclosure.

FIG. 15 is a schematic structural diagram of a deframing apparatus 1500 according to an embodiment of the present disclosure. Referring to FIG. 15, the apparatus 1500 includes a processor 1510, a memory 1520, a communications bus 1530, and a communications interface 1540. The processor 1510, the memory 1520, and the communications interface 1540 are connected to and communicate with each other using the communications bus 1530. The processor 1510 may be a single-core or multi-core CPU, an ASIC, or is configured as one or more integrated circuits implementing this embodiment of the present disclosure. The memory 1520 may be a high-speed RAM, or may be a non-volatile memory, for example, a flash memory, or at least one magnetic disk storage. The memory 1520 is configured to store a computer executable instruction. Further, the computer executable instruction may include program code.

The processor 1510 runs the computer executable instruction, and further, the processor 1510 is configured to perform the method steps described in the method in Embodiment 3.

Further, in terms of physical entities, for the deframing apparatus, an FPGA, an ASIC, an SoC, a CPU, an NP, a DSP, an MCU, a PLC, or another integrated chip may be used.

In this embodiment of the present disclosure, the deframing apparatus 1500 is provided on a receiving side. In a downstream data stream received by the apparatus 1500, a line rate corresponding to a second TC frame is lower than a line rate of a first TC frame such that compared with a downstream rate in the other approaches, in this embodiment of the present disclosure, a rate of a receiver on a receiving side is decreased and a bandwidth of the receiver is narrowed, thereby decreasing an optical link loss and increasing an optical power budget.

Embodiment 8

This embodiment of the present disclosure provides a PON system. The PON system includes an OLT, a first ONU, and a second ONU. The OLT is connected to the first ONU and the second ONU using an ODN. As shown in FIG. 2 or FIG. 3, the OLT configured to generate a first TC frame and a second TC frame separately, where a downstream rate of the first TC frame is 2.488 Gbps or 10 Gbps, a downstream rate of the second TC frame is 1/N of the downstream rate of the first TC frame, and a sum of frame lengths of the first TC frame and the second TC frame is 125 μs, where N is an integer greater than 1, perform bit mapping on the second TC frame to generate a third TC frame, where the bit mapping refers to identifying each bit of the second TC frame using N bits, and send the first TC frame and the third TC frame to the first ONU and the second ONU, the first ONU configured to receive the first TC frame and the third TC frame, and perform synchronization with the first TC frame, and parse the first TC frame, and the second ONU configured to receive the first TC frame and the third TC frame, and obtain the third TC frame, and perform bit mapping restoration on the third TC frame to generate the second TC frame, and parse the second TC frame.

It should be understand that Embodiment 8 of the present disclosure is a system embodiment of Embodiments 1 to Embodiment 7, and certainly, the descriptions of Embodiments 1 to Embodiment 7 are also applicable to this embodiment of the present disclosure, and for description about technical details, refer to the descriptions of Embodiments 1 to Embodiment 7, and details are not described herein again.

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only, that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on specific applications and design constraint conditions of the technical solutions. A person skilled in the art may use different methods to implement the described functions for each specific application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A framing method in a passive optical network (PON), comprising:

separately generating, by an optical line terminal (OLT), a first sub-frame and a second sub-frame, wherein a downstream rate of the first sub-frame is from different from a downstream rate of the second sub-frame;

performing, by the OLT, bit mapping on the second sub-frame to generate a third sub-frame, wherein the bit mapping refers to identifying each bit of the second sub-frame using N bits, wherein N is an integer greater than 1, and wherein the downstream rate of the second sub-frame is the same as a downstream rate of the third sub-frame; and sending, by the OLT, a frame to an optical network unit (ONU), wherein the frame comprises the first sub-frame and the third sub-frame.

2. The method according to claim 1, further comprising performing first coding on the second sub-frame, wherein the first coding comprises one of Reed-Solomon code (RS) (255,239) coding, RS (248,216) coding, low-density parity-check code (LDPC) coding, or cascade forward error correction (FEC) coding.

3. The method according to claim 1, further comprising scrambling the second sub-frame.

4. The method according to claim 1, further comprising inserting a pseudo gigabit-capable PON encapsulation method (GEM) frame header into the third sub-frame.

5. The method according to claim 4, wherein inserting the pseudo GEM frame header into the third sub-frame comprises:
- inserting a placeholder into the third sub-frame;
- scrambling the third sub-frame into which the placeholder is inserted; and
- filling the placeholder using the pseudo GEM frame header.

6. The method according to claim 5, further comprising performing second coding on the first sub-frame and the third sub-frame into which the pseudo GEM frame header is inserted, wherein the second coding comprises one of Reed-Solomon code (RS) (255,239) coding, RS (248,216) coding, low-density parity-check code (LDPC) coding, or cascade forward error correction (FEC) coding.

7. The method according to claim 6, further comprising scrambling the first sub-frame and the third sub-frame after the second coding.

8. The method according to claim 1, wherein a physical control block downstream (PCBd) field of the second sub-frame comprises a field indicating a frame length of the second sub-frame.

9. The method according to claim 1, wherein a frame length of the first sub-frame comprises an integer multiple of 239 bytes.

10. The method according to claim 1, wherein a frame length of the first sub-frame comprises an integer multiple of 248 bytes.

11. A deframing method in a passive optical network (PON), comprising:
- receiving, by an optical network unit (ONU), a frame comprising a first sub-frame and a second sub-frame from an optical line terminal (OLT), wherein a downstream rate of the first sub-frame is different from a downstream rate of the second sub-frame;
- obtaining, by the ONU, the second sub-frame;
- performing, by the ONU, bit mapping restoration on the second sub-frame to generate a third sub-frame, wherein the bit mapping restoration refers to restoration of every N bits in the second sub-frame to one bit, wherein N is an integer greater than 1; and
- parsing, by the ONU, the second sub-frame.

12. The method according to claim 11, further comprising descrambling the second sub-frame.

13. The method according to claim 11, further comprising decoding the second sub-frame.

14. The method according to claim 11, wherein obtaining the second sub-frame comprises removing, according to frame length information of the second sub-frame from a physical control block downstream (PCBd) field of the second sub-frame, a pseudo gigabit-capable PON encapsulation method (GEM) frame to obtain the second sub-frame.

15. A framing apparatus, comprising:
- a memory comprising instructions; and
- a processor coupled to the memory, wherein the instructions cause the processor to be configured to:
- separately generate a first sub-frame and a second sub-frame, wherein a downstream rate of the first sub-frame is different from a downstream rate of the second sub-frame;
- perform bit mapping on the second sub-frame to generate a third sub-frame, wherein the bit mapping refers to identifying each bit of the second sub-frame using N bits, wherein N is an integer greater than 1, and wherein the downstream rate of the second sub-frame is the same as a downstream rate of the third sub-frame; and
- send a frame to an optical network unit (ONU), wherein the frame comprises the first sub-frame and the third sub-frame.

16. The apparatus according to claim 15, wherein the instructions further cause the processor to be configured to perform first coding on the second sub-frame, wherein the first coding comprises one of Reed-Solomon code (RS) (255,239) coding, RS (248,216) coding, low-density parity-check code (LDPC) coding, or cascade forward error correction (FEC) coding.

17. The apparatus according to claim 15, wherein the instructions further cause the processor to be configured to scramble the second sub-frame.

18. The apparatus according to claim 15, wherein instructions further cause the processor to be configured to insert a pseudo GPON encapsulation method (GEM) frame header into the third sub-frame.

19. The apparatus according to claim 18, wherein the instructions further cause the processor to be configured to:
- insert a placeholder into the third sub-frame;
- scramble the third sub-frame into which the placeholder is inserted; and
- fill the placeholder using the pseudo GEM frame header.

20. The apparatus according to claim 19, wherein the instructions further cause the processor to be configured to perform second coding on the first sub-frame and the third sub-frame into which the pseudo GEM frame header is inserted, wherein the second coding comprises one of Reed-Solomon code (RS) (255,239) coding, RS (248,216) coding, low-density parity-check code (LDPC) coding, or cascade forward error correction (FEC) coding.

21. The apparatus according to claim 20, wherein the instructions further cause the processor to be configured to scramble the first sub-frame and the third sub-frame after the second coding.

22. The apparatus according to claim 15, wherein a physical control block downstream (PCBd) field of the second sub-frame comprises a field indicating a frame length of the second sub-frame.

23. A deframing apparatus, comprising:
- a memory comprising instructions; and
- a processor coupled to the memory, wherein the instructions cause the processor to be configured to:
- receive a frame comprising a first sub-frame and a second sub-frame, wherein a downstream rate of the first sub-frame is different from a downstream rate of the second sub-frame;
- obtain the second sub-frame;
- perform bit mapping restoration on the second sub-frame to generate a third sub-frame, wherein the bit mapping restoration refers to restoration of every N bits in the second sub-frame to one bit, wherein N is an integer greater than 1; and
- parse the third sub-frame.

24. The apparatus according to claim 23, wherein the instructions further cause the processor to be configured to descramble the second sub-frame.

25. The apparatus according to claim 23, wherein the instructions further cause the processor to be configured to decode the second sub-frame.

26. The apparatus according to claim 23, wherein the instructions further cause the processor to be configured to discard, according to frame length information of the second sub-frame from a field in a physical control block downstream (PCBd) of the second sub-frame, a pseudo gigabit-capable passive optical network encapsulation method (GEM) frame to obtain the second sub-frame.

* * * * *

UNITED STATES PATENT AND TRADEMARK OFFICE
CERTIFICATE OF CORRECTION

PATENT NO. : 10,667,025 B2
APPLICATION NO. : 15/818108
DATED : May 26, 2020
INVENTOR(S) : Fei Ye et al.

It is certified that error appears in the above-identified patent and that said Letters Patent is hereby corrected as shown below:

On the Title Page

Other Publications: Line 3, "vol.2115, Dec. 5, 2013, 186 pages" should read "vol.2/15, Dec. 5, 2013, 186 pages.

Signed and Sealed this
Fourteenth Day of July, 2020

Andrei Iancu
*Director of the United States Patent and Trademark Office*